INVENTOR:
Roelof M. M. Oberman
BY: Michael S. Striker
Agt.

INVENTOR:
Roelof M. M. Oberman
BY: Michael S. Striker
Agt.

INVENTOR:
Roelof M. M. Oberman
BY: Michael S. Striker
Agt.

FIG. 4 EXCHANGE A

INVENTOR:
Roelof M. M. Oberman
BY: Michael S. Striker
Agt.

INVENTOR:
Roelof M.M. Oberman
BY: Michael S. Striker
Agt.

April 29, 1958 R. M. M. OBERMAN 2,832,834

SIGNALLING ARRANGEMENT FOR TELECOMMUNICATION SYSTEMS

Filed June 4, 1952 13 Sheets-Sheet 6

FIG.6 EXCHANGE B

INVENTOR:
Roelof M.M. Oberman
BY: Michael S. Striker
Agt.

SIGNALLING ARRANGEMENT FOR TELECOMMUNICATION SYSTEMS

Filed June 4, 1952 13 Sheets-Sheet 7

INVENTOR:
Roelof M.M. Oberman
BY: Michael S. Striker
Agt.

INVENTOR:
Roelof M.M. Oberman
BY: Michael S. Striker
Agt.

INVENTOR:
Roelof M. M. Oberman
BY: Michael S. Striker
Agt.

EXCHANGE B

INVENTOR:
Roelof M. M. Oberman
BY: Michael S. Striker
Agt.

April 29, 1958 R. M. M. OBERMAN 2,832,834

SIGNALLING ARRANGEMENT FOR TELECOMMUNICATION SYSTEMS

Filed June 4, 1952 13 Sheets-Sheet 11

INVENTOR:
Roelof M. M. Oberman
BY: Michael S. Striker
Agt.

INVENTOR:
Roelof M. M. Oberman
BY: Michael S. Striker
Agt.

SIGNALLING ARRANGEMENT FOR TELECOMMUNICATION SYSTEMS

Filed June 4, 1952 13 Sheets-Sheet 13

INVENTOR:
Roelof M.M. Oberman
BY: Michael S. Striker
Agt.

United States Patent Office 2,832,83

Patented Apr. 29, 195

2,832,834

SIGNALLING ARRANGEMENT FOR TELECOMMUNICATION SYSTEMS

Roelof M. M. Oberman, The Hague, Netherlands, assignor to De Staat der Nederlanden, Ten Deze Vertegenwoordigd Door de Directeur-Generaal der Posterijen, Telegrafie en Telefonie, The Hague, Netherlands Application June 4, 1952, Serial No. 291,613
In Netherlands April 26, 1941

Section 1, Public Law 690, August 8, 1946
Patent expires April 26, 1961

23 Claims. (Cl. 179—18)

The present invention relates to automatic signalling systems, in particular to systems in which registers are used, which control the various switching operations by means of voice or audio-frequency currents.

This application is a continuation-in-part of the copending application Serial No. 772,870, filed September 8, 1947, for "Automatic Telegraph or Telephone System for Telemetering or Telecontrol."

It is an object of the present invention to control the local or trunk switching means by means of audio-frequency currents.

It is another object of the present invention to provide a system in which all facilities of registers may be used.

It is a further object of the present invention to provide the system with a frequency test controlling the position of the local and trunk switching means.

It is still another object of the present invention to identify the calling subscriber by means of a frequency test.

A signalling arrangement comprises in its broadest aspect a plurality of generators each producing an alternating current having a frequency different from the frequency of the alternating currents produced by the other of the generators; a first set of band filters each connected in circuit with one of the generators and passing the alternating current frequency produced by the generator to which it is connected in circuit, a second set of band filters each connected in circuit with the generators and passing the alternating current frequency produced by the generator to which it is connected in circuit, a first switch means having a first bank of contacts connected, respectively, to the first band filters, a second switch means having a second bank of contacts connected, respectively, to the second band filters, a first wiper brushing the first bank of contacts, a second wiper brushing the second bank of contacts, a connection between the first and second wipers, current-responsive means inserted in the connection, electromagnetic means for moving one of the wipers over the bank of contacts cooperating with the same, and means controlled by the current-responsive means for energizing the electromagnetic means when the current-responsive means does not respond to any current, whereby the electromagnetic means is put out of action when the wipers contact, respectively, contacts of the banks connected to the band filters.

An embodiment of the present invention comprises a first station sending a current impulse, a second station to be connected with the first station, register means, a plurality of voice frequency generators forming part of the register means, each of the generators producing an alternating current having a frequency different from the frequencies of the alternating currents produced by the other of the generators, marking switch means forming part of the register means, the marking switch means having a bank of contacts connected, respectively, to the generators so that the contacts of the bank of said mark ing switch means are marked, respectively, by the fre quencies of the alternating currents produced by th generators, the frequency of any of the contacts of th bank of the marking switch means being different fror any of the frequencies of the other contacts of the ban of the marking switch means, a wiper forming part of th marking switch means and cooperating with the bank c contacts of the marking switch means, means for pos tioning the wiper of the marking switch means by th current impulse sent by the first station, selector switc means for making a connection between the first statio and the second station, the selector switch means havin a bank of contacts connected, respectively, to the genera tors so that the contacts of the bank of the selector switc means are marked, respectively, by the frequencies of th alternating currents produced by the generators, the fre quency of any of the contacts of the bank of the selec tor switch means being different from any of the fre quencies of the other contacts of the contact bank of th selector switch means, the frequencies of the contacts c the bank of the selector switch means being equal, respec tively, to the frequencies of the contacts of the bank c said marking switch means, a wiper forming part of th selector switch means and cooperating with the ban of contacts of the selector switch means, an electric ci cuit, an electro-magnet having a winding arranged in th electric circuit, the electromagnet stepping the wiper c the selector switch means along the bank of contacts c the selector switch means, and means for interruptin the electric circuit and thereby de-energizing the windin of the electromagnet when the wipers contact, respective ly, contacts of the banks of the marking and selecto switch means being marked by equal frequencies so a to stop the wiper of the selector switch means, thereb positioning the selector switch means according to th current impulse sent by the first station so that the se lector switch means connect the first station and the sec ond station with each other.

Preferably a contact is arranged in the electric circui in series with the winding of the electromagnet and mean are provided for opening the electric contact so as to de energize the winding of the electromagnet when the wiper contact, respectively, contacts of the banks of the markin and selector switch means being marked by equal fre quencies.

Preferably a relay controls the electric contact so a to open the same when the relay is energized, and a se of rectifiers has input terminals connected, respectively, t the wipers of the marking and selector switch means the output of the set of rectifiers being connected to th relay.

Preferably means are provided for preventing the ener gization of the relay when the second station is busy The novel features which are considered as character istic for the invention are set forth in particular in th appended claims. The invention itself, however, bot as to its construction and its method of operation, to gether with additional objects and advantages thereof will be best understood from the following descriptio of specific embodiments when read in connection wit the accompanying drawings, in which:

Figure 1:
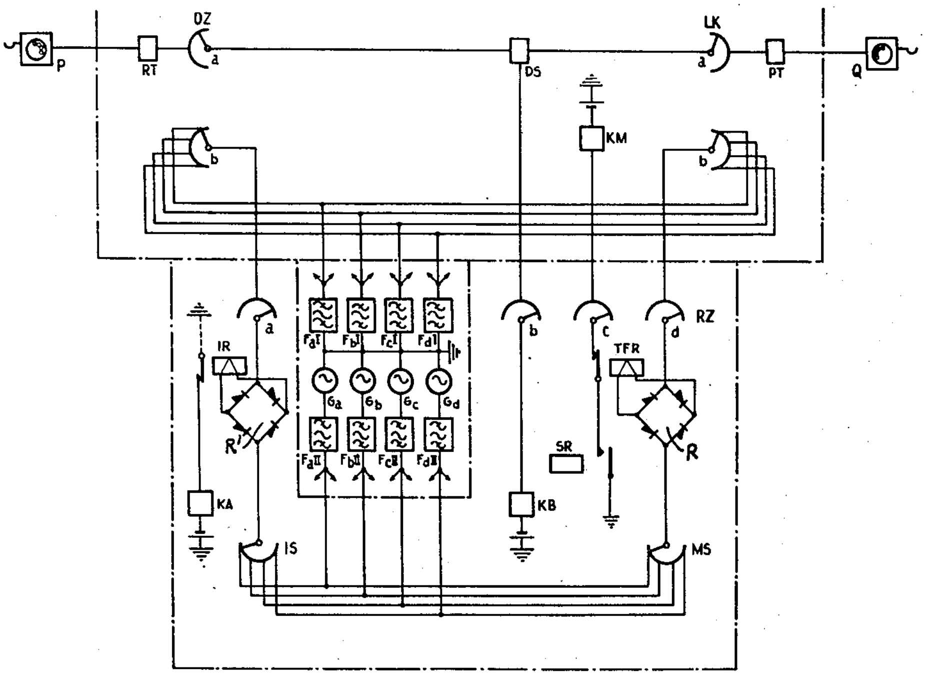
Fig. 1 is a circuit diagram of an embodiment of th invention having a positioning and identifying register
Figure 1A:
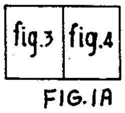
Figs. 1*a*, 1*b*, and 1*c* are diagrams showing three dif ferent ways of combining the circuit diagrams shown i Figs. 3 to 12.
Figure 1B:
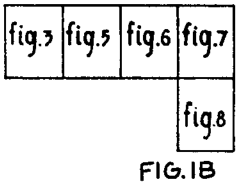
Figure 1C:
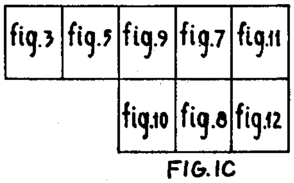
Figure 13:
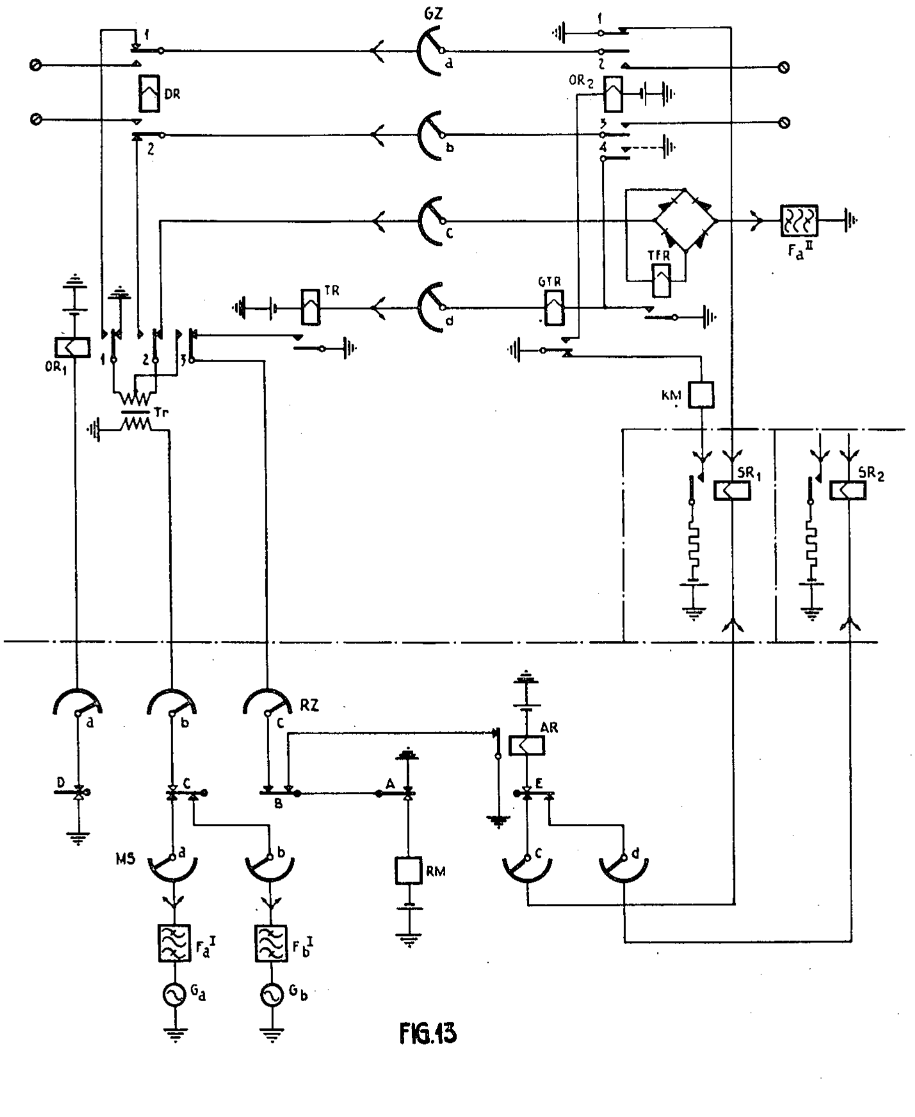

Figs. 3, 5, 6, 7 and 8 taken together as indicated in Fig. 1*b*, show an embodiment of a trunk telegraph or telephone system according to the invention;

Figs. 3, 5, 9, 10, 7, 8, 11 and 12 taken together as indicated in Fig. 1*c* show an embodiment of a trunk routing system according to the invention; and Fig. 13 shows an embodiment of a local trunk group finder according to the invention.

Fig. 1 shows the principle of the invention in an arrangement of an automatic exchange associated with e. g. four subscribers. Having lifted his hook the calling subscriber P receives in a conventional way dialing tone indicating that over the call finder OZ a free cord DS has been seized to which a free register is connected over a register finder RZ. The number wanted by the calling subscriber consisting in this example of one digit, is registered by means of a marking switch MS which has four marking wires and is positioned by a stepping magnet KB the winding of which is connected in series to the *b*-wiper of the register finder RZ. At the input the cord DS is connected with a call finder OZ and at the output with a line selector LK. The winding of the stepping magnet KM of the line selector LK is energized in an electric circuit including a contact controlled by a starting relay SR, which operates when the wanted number has been registered as more fully to be explained hereinafter. The line selector LK starts and the wiper *b* thereof tests the associated bank having four contacts. Four generators $G_a$, $G_b$, $G_c$ and $G_d$ produce four frequencies corresponding, respectively, to those of the band pass filters $F_a^I$, $F_a^{II}$; $F_b^I$, $F_b^{II}$; $F_c^I$, $F_c^{II}$, and $F_d^I$ and $F_d^{II}$.

The stepping magnet KM of the line selector LK is released as soon as the test wiper thereof has found the filter $F^I$ that passes the current with the frequency applied over the marking switch MS, in consequence whereof a D. C. relay TFR which is connected to a rectifier arrangement R is energized by the rectified alternating current and interrupts by means of a contact controlled by relay TFR the circuit of the stepping magnet KM of the line selector LK, so that this selector stops in the desired position, after which the transmission of ringing tone, the switching through of the cord and the termination of the operation of the register can be effected in the usual way.

In Fig. 1 the testing bank *b* of the line selector LK is connected with the bank *b* of the call finder OZ so that the calling subscriber can be identified by the register in the following manner: The wiper *b* of the call finder OZ is connected to the bank *a* of the register finder RZ the wiper *a* of which is connected to one input terminal of a rectifier arrangement R′ the output of which is connected to an identification relay IR. The other input terminal of the rectifier R′ is connected to the wiper of an identification switch IS. The four contacts in the bank of the identification switch IS are connected to the four generators $G_a$, $G_b$, $G_c$, and $G_d$, respectively.

Under the control of switching elements (not shown) with which the register is equipped, the stepping magnet KA of the identification switch IS is energized, so that the wiper of the switch IS rotates until the same has found that frequency which is passed by band filter $F^I$ and indicated by the position of the wiper *b* of the call finder OZ.

When the correct frequency is found, the relay IR is energized, after which magnet KA is released by opening the contact of the relay IR. The position of the identification switch IS shows the number of the calling subscriber. Double test can be avoided in the known manner, optionally by means of application of an auxiliary direct current test. The automatic exchange for four subscribers shown in Fig. 1 can be extended to a decimal automatic exchange by enlarging the switches to decimal switches, by increasing the number of frequencies to ten, and extending the number of filters to ten corresponding to the various frequencies.

It is, however, not necessary to use ten different frequencies for a decimal automatic exchange according to the invention, since four different frequencies will suffice, which, when used in combinations, can indicate maximally 16 different positions of the switching elements.

The principle of such an arrangement will be explained with reference to Fig. 2, in which a decimal automatic exchange is shown making use of combinations of frequencies in order to characterize the various positions of the switching elements. The calling subscriber P lifts the hook or gives the starting criterion, and then receives the dialing tone.

A free cord DS and a free register are then connected to the subscriber, as explained with reference to Fig. 1. The selected number consisting of one digit, is registered by the marking switch MS, which is adjusted by the stepping magnet KB as more fully described in connection with Fig. 1, and can be converted by means of the four contact banks *a–d* of the marking switch MS into a combination of four frequencies.

Figure 2:
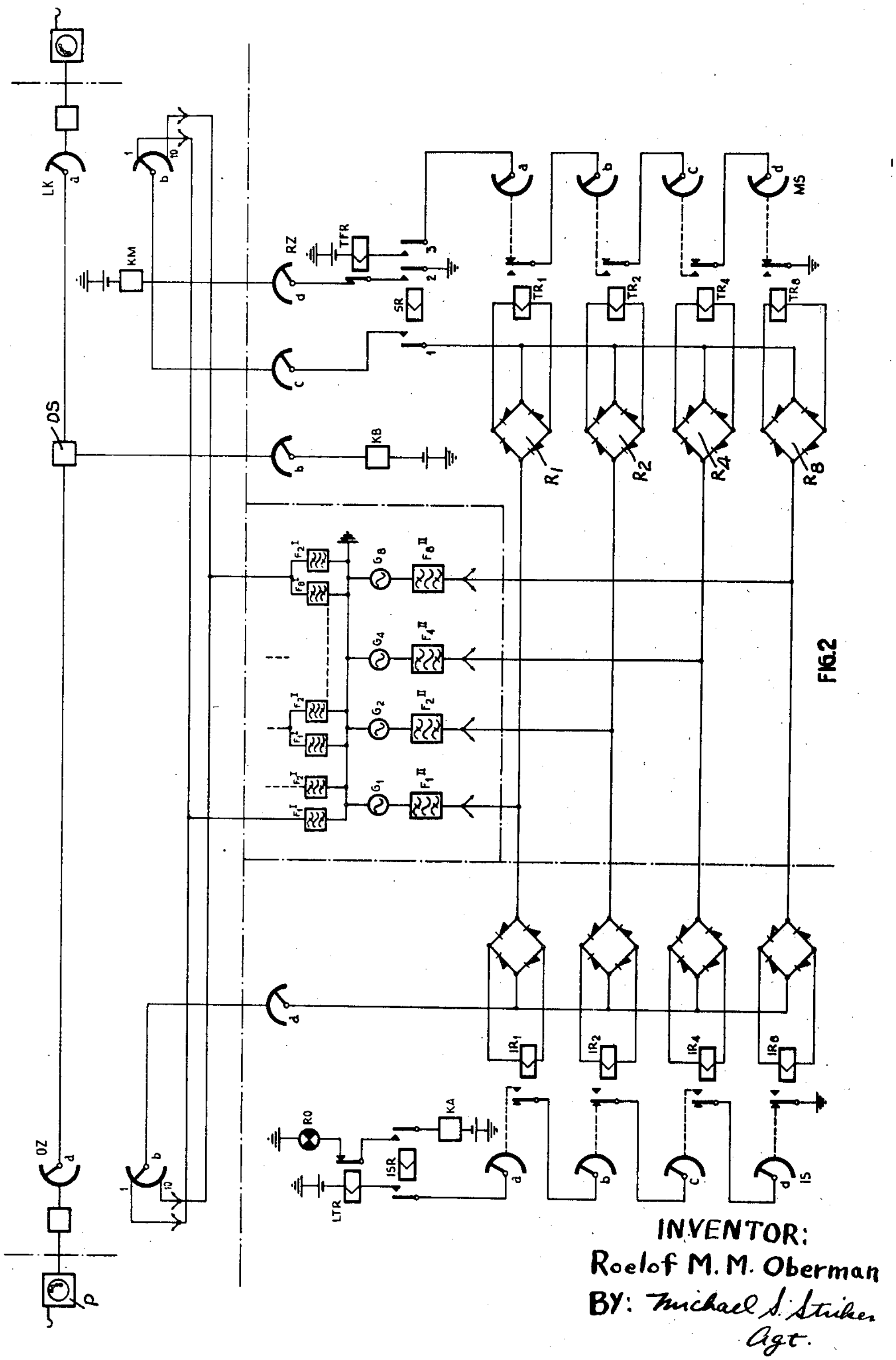
Fig. 2 shows a decimal automatic exchange with a posi tioning and identifying register according to the invention

In Fig. 2 the combinations of the frequencies are such that, if these frequencies are given the indices 1, 2, 4 and 8, respectively, the sum of the indices of the combination of frequencies indicated by a particular position of the marking switch MS, is equal to the digit transmitted by the calling subscriber.

In many cases the marking switch can advantageously be replaced by a relay counting arrangement, which registers the digits as combinations of the energization of four relays.

The testing bank *b* of the line selector LK has ten contacts the first of which is connected to the filter $F_1^I$ that passes the frequency of generator $G_1$. The second contact of the testing bank is connected to the filter $F_2^I$, that corresponds to the frequency of generator $G_2$, the third contact to the two filters $F_1^I$, and $F_2^I$ in parallel, passing the frequencies of generators $G_1$ and $G_2$, the fourth contact to filter $F_4^I$ (not shown) and so on up to the tenth contact which is connected to filters $F_8^I$ and $F_2^I$ in parallel. Conversions may be obtained by an unsystematic mounting of the filters.

When the registering of the number of the called subscriber by the marking switch MS is finished, the register starts the line selector LK. The starting relay SR is energized in a way not shown in Fig. 2. The contact 2 of the starting relay SR closes the circuit of the stepping magnet KM of the line selector LK. The contact 3 of the starting relay SR prepares a circuit for the test relay TFR. The contact 1 of the starting relay SR applies the four frequencies to four rectifier arrangements, $R_1$, $R_2$, $R_4$, $R_8$, the outputs of which are connected to four checking relays $TR_1$, $TR_2$, $TR_4$ and $TR_8$, respectively. These relays each control one changeover contact. One combination of the operation of relays $TR_1$, $TR_2$, $TR_4$, and $TR_8$ is shown in Fig. 2, this combination corresponding to the number $6=4+2$. The relays $TR_1$, $TR_2$, $TR_4$ and $TR_8$ are energized in every outlet of the line selector LK in accordance with the combination of frequencies belonging to the particular position of the testing wiper *b* of the line selector.

The four contact banks *a*, *b*, *c* and *d* of the marking switch MS and the change-over contacts of the relays $TR_1$, $TR_2$, $TR_4$ and $TR_8$ are so connected to the remaining arrangement that e. g. in position 6 $(=2+4)$ of the marking switch MS a circuit is closed over the change-over contacts of the relays $TR_1$, $TR_2$, $TR_4$ and $TR_8$ and the contact banks *a–d* of the marking switch MS if the relays $TR_2$ and $TR_4$ are energized, thus completing a circuit for the relay TFR.

Therefore, it will be understood that if the test-wiper *b* of line selector LK energizes the relays $TR_1$, $TR_2$, $TR_4$, $TR_8$, on a particular outlet in the combination indicated by the position of the marking switch MS, the relay TFR is energized and the circuit of the stepping magnet KM of the line selector LK is interrupted. In this position the line selector LK has reached the outlet to which the wanted subscriber is connected. After this the operation of the register can be finished in a known way.

The circuit for the identification of the calling subscriber operates according to the same principle as the register circuits, with the difference that during the identification the call finder OZ is stationary and the identification switch IS in the register moves, while in the register circuit the marking switch MS is stationary. As in the automatic exchange system according to Fig. 1, the generators and the filters can change places, so that the testing multiple of the call finders, group selectors and line selectors is permanently under tone.

Figure 3:
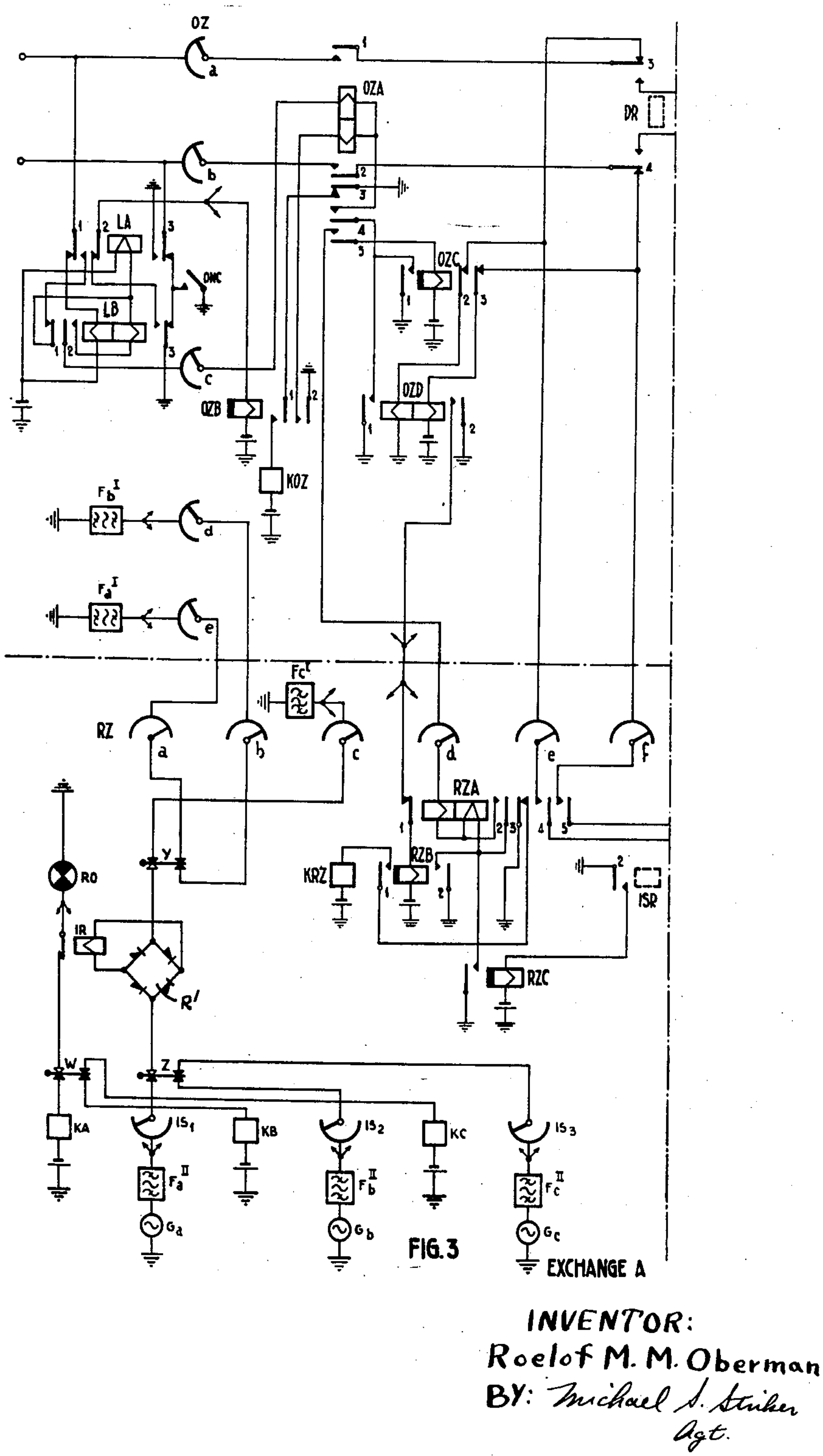
Figs. 3 and 4 show together, as indicated in Fig. 1*a* the arrangement of a three digit telegraph or telephon system according to the invention.
Figure 4:
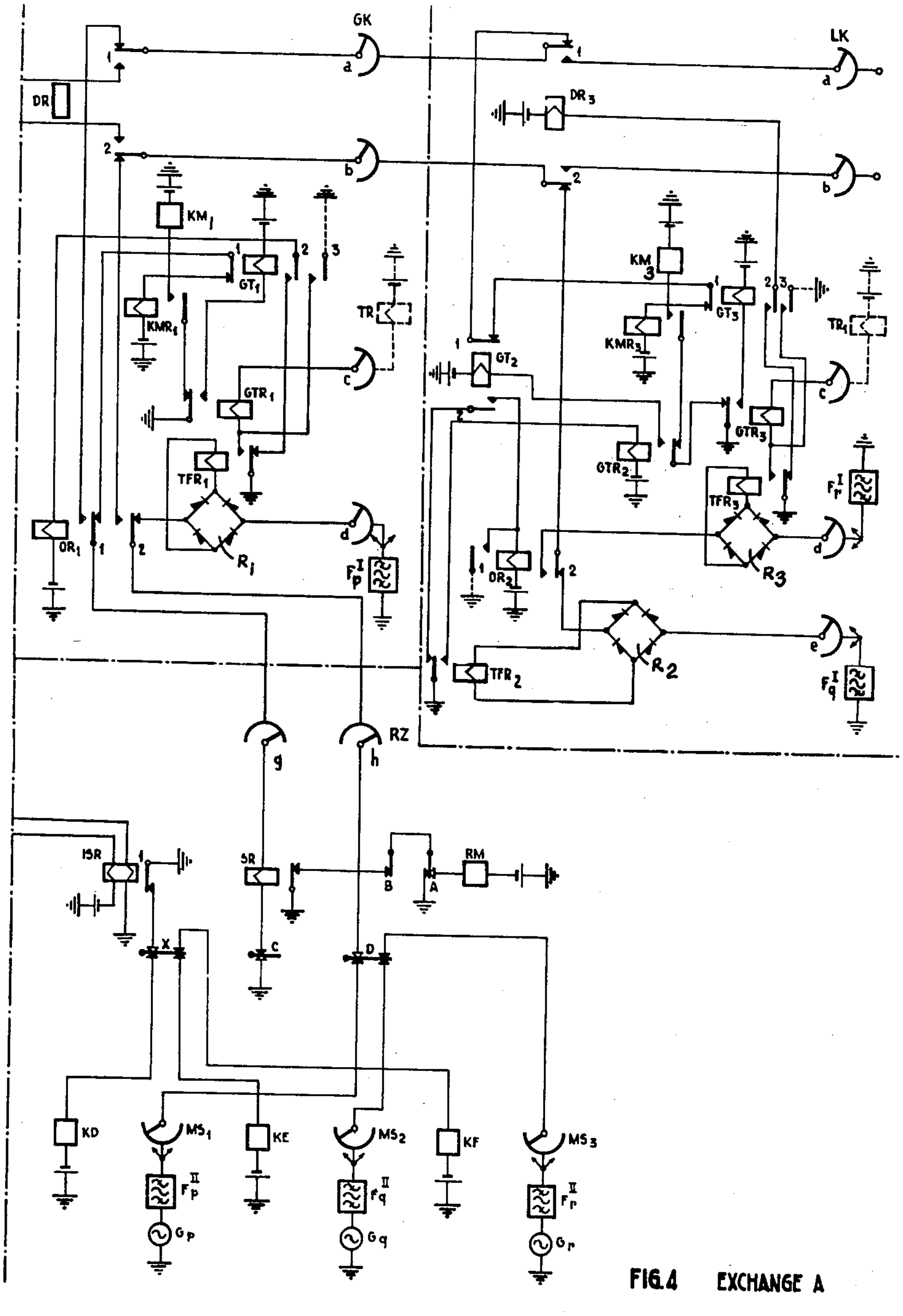

Referring now to Figs. 3 and 4, the principle disclosed hereinabove with reference to Fig. 1 is applied to an automatic exchange serving subscribers the numbers of which have three digits. The arrangement is only shown insofar as it is necessary to explain the operation of the automatic exchange.

When the calling subscriber's hook (not shown) is lifted a circuit is closed for the relay LB of the line circuit, the circuit running from ground over contact 3 of relay LB, contact 3 of relay LA, *b*-wire, subscriber's loop (not shown), *a*-wire, contact 1 of relay LA, first winding of relay LB, battery, to ground. Relay LB attracts the armature thereof and over the make position of contact 3 the slow releasing relay OZB is operated which starts the line finder OZ. The circuit for relay OZB leads from ground in the line circuit over front contact 3 of relay LB, contact 2 of relay LA, a multiple connected with relay OZB belonging to a seized group of line finders, battery, to ground. The relay OZB closes an operating circuit for the stepping magnet KOZ of the line finder OZ which starts hunting for the calling line. By means of the off-normal contact ONC the *b*-wire is kept grounded.

When the calling line is reached a circuit is established over the *c*-wiper, relay LA of the line circuit and switching relay OZA of the line finder circuit being operated.

This circuit runs from ground in the line finder circuit over the contact 2 of relay OZB, first and second winding of relay OZA, wiper *c* of the line finder OZ, contact 2 of relay LB, second winding of relay LB, winding of relay LA, battery, to ground. Let it be supposed that the shown line finder OZ reaches the calling line first. The stepping magnet KOZ is released by interrupting the operating circuit thereof at contact 3 of relay OZA. Relay LA interrupts the circuit for the multiples of relay OZB by means of contact 2 so that the remaining line finders are stopped.

Relay OZA switches the *a*- and *b*-wire to the register finder RZ by means of contacts 1 and 2, whereas the stepping magnet KOZ cannot be started by another subscriber because the circuit thereof is interrupted at contact 3 of relay OZA. Relay OZA holds itself over the second low ohmic winding and the contact 4 thereof. By means of contact 5 a circuit is prepared for relay OZC.

A circuit is now closed for relay OZD from ground in the line circuit, over contact 3 of relay LA, bank and wiper *b* of the line finder OZ, contact 2 of relay OZA, contact 4 of relay DR, contact 3 of relay OZC, first winding of relay OZD, battery, to ground. Contact 1 of relay OZD closes a holding circuit for relay OZA whereas over contact 2 of the relay OZD a circuit is closed for a slowly releasing relay RZB.

The register finder RZ is now operated by means of the stepping magnet KRZ thereof which is operated in a circuit from ground, over contact 3 of relay RZA, contact 1 of relay RZB, magnet KRZ, battery, to ground. The energization of the stepping magnet KRZ is continued until the calling line is found. At this moment relay OZC in the line finder circuit and relay RZA in the register are operated in the circuit: ground in the register, over contact 2 of relay RZB, first and second winding of relay RZA, wiper *d* of the register finder RZ, contact 5 of relay OZA, winding of relay OZC, battery, to ground. The operating circuit for magnet KRZ in th register is interrupted at contact 3 of relay RZA so th the register finder RZ is stopped on the calling line. Th impulse relay ISR in Fig. 4 is now connected to th calling subscriber over contacts 4 and 5 of relay RZ in Fig. 3 and wipers *e* and *f* of the register finder R A holding circuit over the low ohmic winding of rela RZA is established at the contact 2 thereof. Contact of relay ISR shown in Fig. 3 closes a circuit for the slo releasing relay RZC.

The slow releasing relay OZC in the line finder circui is operated in the operating circuit of the switching rela RZA in the register and interrupts the circuit for rela OZD whereas contact 1 of the relay OZC closes a hold ing circuit of relay OZA, thus taking over the part c contact 1 of relay OZD. Relay OZC holds the cor and switches dialing tone to the calling subscriber wh now may start the selection.

When pulsing out the wanted digits relay ISR i the register in Fig. 4 is energized in three series by th impulses. During the first series the cam X of a se quence switch establishes a circuit for the stepping magne KD of a first marking switch $MS_1$; during the secon series a circuit for the stepping magnet KE of the secon marking switch $MS_2$ and during the third series for th stepping magnet KF of the third marking switch $MS_3$ ar established by the cam X. Thus the marking switche $MS_1$, $MS_2$, and $MS_3$ are positioned by the stepping mag nets KD, KE and KF, respectively.

The sequence switch regulates also the positioning c the group selector GK and the final selector LK b controlling over the cams A, B, C and D thereof, th transmission of the different frequencies and the oper ation of the associated stepping magnets and the steppin of the sequence switch.

During the first position cam D connects the mark ing switch $MS_1$ with the register finder RZ. The markin switch $MS_1$ has a bank of contacts marked by frequenc generators corresponding to the hundreds digits of th numbers. Now a specific one of these frequencies sup plied by a generator $G_p$ and the associated filter $F_p^I$ is applied over the marking switch $MS_1$, cam D of th sequence switch, wiper *h* of the register finder RZ, bac contact 2 of relay $OR_1$, rectifier arrangement $R_1$ th output of which is connected to a test relay $TFR_1$, t wiper *d* of group selector GK.

The relay $KMR_1$ is energized in a circuit from groun in register, cam C of sequence switch SR, wiper *g* c register finder RZ, back contact 1 of relay $OR_1$, back cor tact 1 of relay $GT_1$, relay $KMR_1$, battery, to grounc Relay $KMR_1$ attracts the armature thereof, thus th stepping magnet $KM_1$ of the group selector GK is er ergized in a circuit: ground, back contact of relay GTR front contact of relay $KMR_1$, stepping magnet $KM_1$, ba ery, to ground. Thus the group selector GK is startec When the wiper *d* thereof reaches a contact which i connected with the filter $F_p^I$ passing the frequency issue by generator $G_p$, relay $TFR_1$ is energized. If a free ou let is found over the wiper *c* by a direct current tes relay $GTR_1$ is energized in a circuit: ground, front cor tact of relay $TFR_1$, relay $GTR_1$, wiper *c* of group selecto GK, test-relay TR, battery, to ground. This causes th attraction of the armature of relay $GTR_1$, which break the circuit for stepping magnet $KM_1$, so that the group se lector GK is stopped in the desired position. Relay GT is now energized in a circuit: ground, front contact c relay $GTR_1$, relay $GT_1$, battery, to ground. Thus, holding circuit for relay TR is formed over front cor tact 3 of $GT_1$, relay $GTR_1$, wiper *c* of group selecto GK, relay TR, battery, to ground. With contact 1 rela $GT_1$ breaks the circuit for relay $KMR_1$, thus causin starting relay SR in the register to be released. Back cor tact of SR now energizes the stepping magnet RM c the sequence switch thus switching the next frequenc corresponding to the tens digit to wiper *h* of the registe finder RZ. The emission of the frequency of the marking switch $MS_1$ is stopped and relay $TFR_1$ is released, while via the back contact of relay $TFR_1$ and front contact 2 of relay $GT_1$ the switching relay $OR_1$ is energized, which by means of the contacts 1 and 2 thereof switches the register through to a following stage (in this case the final selector LK).

Relay SR is again energized in a circuit: ground, cam C, relay SR, wiper *g* of the register finder RZ, front contact 1 of relay $OR_1$, back contact 1 of relay DR, wiper *a* of the group selector GK, back contact 1 of relay $DR_3$, back contact 1 of relay $GT_2$, back contact 1 of relay $GT_3$, relay $KMR_3$, battery, to ground. Relay $KMR_3$ attracts the armature thereof and thus closes a circuit for the stepping magnet $KM_3$ from ground over back contact of relay $GTR_3$, back contact of relay $GTR_2$, front contact of relay $KMR_3$, stepping magnet $KM_3$, battery, to ground. The final selector LK is started for positioning according to the tens digit.

Simultaneously the frequency issued by generator $G_q$ is applied to wiper *e* of the final selector LK in the circuit ground, generator $G_q$, filter $F_q^{II}$, marking switch $MS_2$, cam D of sequence switch, wiper *h* of the register finder RZ, front contact 2 of relay $OR_1$, back contact 2 of relay DR, wiper *b* of the group selector GK, back contact 2 of relay $DR_3$, back contact 2 of relay $OR_2$ and the A. C. testing arrangement including rectifier arrangement $R_2$ and relay $TFR_2$, to wiper *e* of the final selector LK.

When wiper *e* of the final selector LK reaches the contact in the level connected to the filter $F_q^I$ which passes the frequency issued by generator $G_q$, relay $TFR_2$ is energized; thus relay $GTR_2$ is energized in a circuit: ground, front contact of relay $TFR_2$, relay $GTR_2$, battery, to ground. By the attraction of the armature thereof relay $GTR_2$ breaks the circuit for the stepping magnet $KM_3$, thus stopping the final selector LK, and at the same time closes a circuit for relay $GT_2$ running from ground over back of contact of relay $GTR_3$, front contact of relay $GTR_2$, relay $GT_2$, battery, to ground.

Thus the circuit for relay SR in the register is interrupted by the contact of relay $GT_2$ so that the stepping magnet RM of the sequence switch is brought to the next position thereof. Therefore the frequency from generator $G_q$ is no longer transmitted so that the relay $TFR_2$ releases, thus causing relay $OR_2$ to be energized in a circuit from ground over back contact of relay $TFR_2$, front contact 2 of relay $GT_2$, relay $OR_2$, battery, to ground. Thus the front contact 1 of relay $OR_2$ closes a holding circuit for relay $OR_2$. The release of relay $TFR_2$ causes the release of relay $GTR_2$ by removing the ground, and thus also causes the deenergization of the relay $GT_2$. Therefore, in order that relay $OR_2$ may be energized and form a holding circuit for itself, either relay $GTR_2$ or relay $GT_2$ must be sufficiently slow in releasing.

With the contact 2 relay $OR_2$ switches the line, over which the frequency is issued, through to the rectifier arrangement $R_3$, test-relay $TFR_3$ and wiper *d* of final selector LK. Relays SR and $KMR_3$ are energized as before, causing the re-energization of the stepping magnet $KM_3$. Wiper *d* of the final selector LK now selects in the tens level determined by the position of wiper *e*, the units digit that corresponds to the frequency emitted by generator G*r*. When this has been done, relay $TFR_3$ is energized, causing the energization of relay $GTR_3$, which with the contact thereof breaks the circuit for stepping magnet $KM_3$, thus stopping the final selector LK. Relay $GT_3$ is energized in a circuit: battery, winding of relay $GT_3$, front contact of relay $GTR_3$, ground. The contact 1 of relay $GT_3$ breaks the circuit for relay SR, thereby indicating that the wanted outlet has been found, so that the sequence switch is restored to normal and the register is disconnected. Relay $GTR_3$ has formed a holding circuit over front contact 3 of relay $GT_3$. Now when the emission is stopped, relay $TFR_3$ is de-energized, thus closing a circuit for relay $DR_3$, the circuit extending from ground over back contact of relay $TFR_3$, front contact 2 of relay $GT_3$, to relay $DR_3$, battery, and ground. Relay DR connects by means of a cord circuit (not shown) the calling subscriber with the called one.

The bottom part of Fig. 3 shows the identification register. The contacts of the banks *d* and *e* of the line finders OZ are connected by a multiple to ten filters $F_a^I$ and $F_b^I$, respectively. The contact on which wiper *e* is positioned indicates the units digit, and the contact on which wiper *d* is positioned indicates the tens digit. The hundreds digit which is not indicated by the call finder OZ, is indicated by the position of wiper *c* of the register finder RZ.

First the stepping magnet KA of the identification switch $IS_1$, is energized in a circuit: ground, interrupter contact RO, back contact IR, cam W of the sequence switch, stepping magnet KA, battery, to ground.

The identification switch $IS_1$ starts stepping and, over cams Z and Y of the sequence switch, the wiper of the identification switch $IS_1$ traces the band filter which passes the frequency corresponding to the unit digit indicated by the position of wiper *e* of line finder OZ, which is supplied to the contact bank of identification switch $IS_1$ by a multiple of different generators $G_a$ and filters $F_a^{II}$.

When this frequency is passed the wiper of the identification switch $IS_1$ has reached a position in which the test relay IR is energized in a circuit: ground, generator $G_a$, band filter $F_a^{II}$, identification switch $IS_1$, cam Z of the sequency switch, rectifier arrangement R′ and relay IR, cam Y of the sequence switch, wiper *a* of the register finder RZ, wiper *e* of line finder OZ, band filter $F_a^I$ to ground.

Relay IR breaks the circuit for the stepping magnet KA, thus stopping the identification switch $IS_1$ in the desired position and simultaneously giving the sequence switch a stepping impulse by suitable means (not shown). The sequence switch now breaks the circuit for relay IR, which releases the armature thereof and closes a circuit for a stepping magnet KB of the identification switch $IS_2$ which now steps until the wiper thereof reaches the contact which corresponds with the tens digit, i. e., with the frequency which is passed by the band filter $F_b^{II}$ generated by generator $G_b$ which corresponds to the position of the wiper *d* of the line finder OZ, thus energizing relay IR, which breaks the circuit for the stepping magnet KB, and so stops the identification switch $IS_2$, while the sequence switch now breaks the circuit for relay IR and connects the stepping magnet KC with ground of the interrupter RO. Identification switch $IS_3$ now steps until the same reaches the position corresponding to the frequency which is passed by the band filter corresponding to the position of wiper *c* of register finder RZ; relay IR is then energized and breaks the circuit for the stepping magnet KC, which stops the identification switch $IS_3$ in the desired position.

The number of the calling subscriber is then indicated by the position of the three identification switches $IS_1$, $IS_2$, $IS_3$, switch $IS_3$ indicating the hundreds, switch $IS_2$ indicating the tens and switch $IS_1$ indicating the units. The register receives three impulse series from the subscriber, which by means of the impulse relay ISR and the cam X of the sequence switch are transferred to the magnets KD, KE and KF of the three marking switches $MS_1$, $MS_2$ and $MS_3$, respectively. Thus these three marking switches are positioned according to the calling subscriber's wish. After a sufficient number of digits has been received the positioning of the group selector GK and the line finder LK commences.

If necessary the marking switches MS can serve as subscriber-identification-switches after the termination of their positioning functions. It is further remarked that in a local exchange according to Figs. 3 and 4 only 10 "receiving filters $F^I$" and ten generators G with ten "transmission filters $F^{II}$" have to be installed. According to the same principles as are applied in Fig. 3, the decimal automatic exchange as explained with reference to Fig. 2, utilizing combinations of testing frequencies, may be extended to larger systems.

The automatic telegraph or telephone system according to the invention involves particular advantages when applied to trunk exchanges and their problems concerning traffic handling. The local exchanges belonging to a system of trunk exchanges according to the invention may be equipped according to an arbitrary system.

Figure 5:
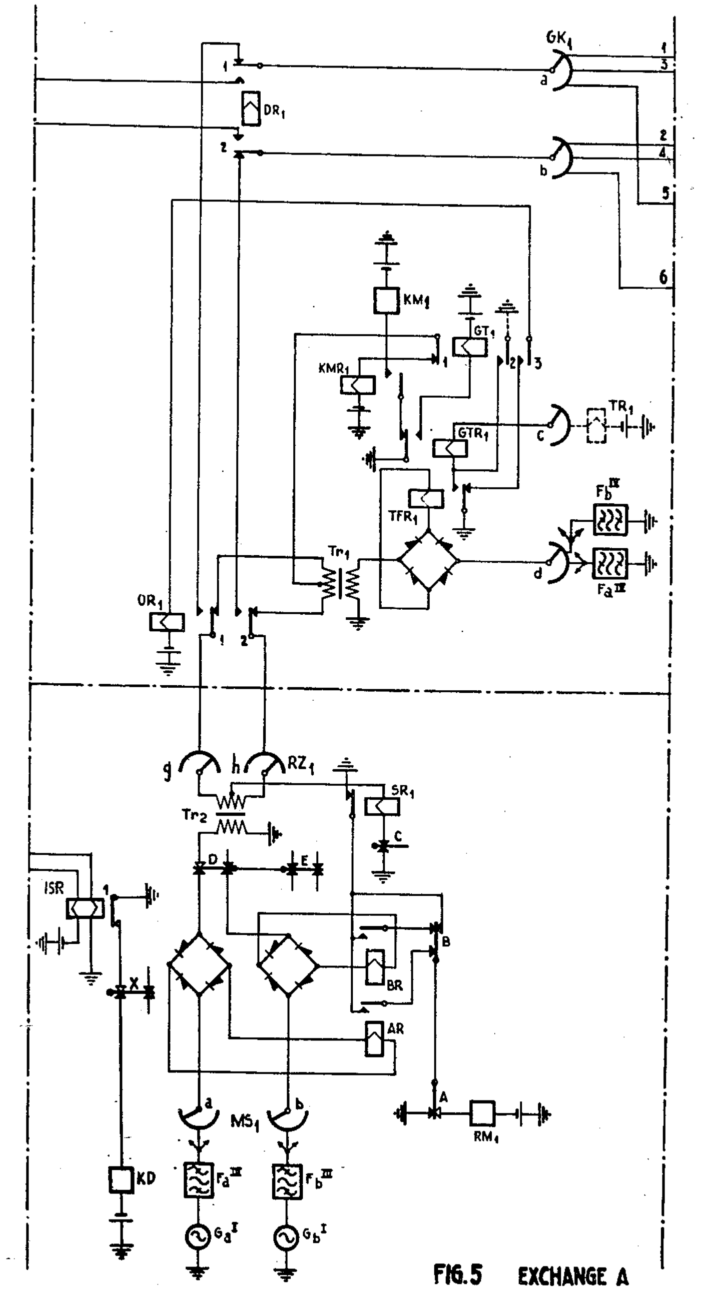

Figs. 3, 5, 6, 7 and 8 show in priniciple the handling of the trunk traffic between three exchanges A, B and C. The trunk group selectors such as $GK_1$ shown in Fig. 5 in the exchange A, have outlets to exchanges not shown and also outlets to the exchange B shown in Fig. 6 and to the exchange C shown in Figs. 7 and 8. The exchange B also has outlets to the exchange C. In this system according to the invention it is possible without the transmission of impulse series in case the bundle of lines between the two exchanges A and C is fully occupied, to lead the traffic from the exchange A to C over the exchange B. The particular advantage that no occupancies in the alternative route in the direction from the exchange A to exchange C over exchange B occur if there are free lines in the direct route from the exchange A to exchange C, is combined by the system according to the invention with a rapid operation approaching the speed of the direct system, since the positioning of the selectors may be carried out either in the alternative route or in the direct route. Therefore, the facility of a "continuous" or a "limited continuous hunting" facility inherent to the register systems can be utilized. This will be explained by means of Figs. 3, 5, 6, 7 and 8. In the exchange A a trunk group selector $GK_1$ is shown in Fig. 5, and a part of a register, which is connected to the group selector $GK_1$ via a register finder $RZ_1$. The positioning of the register is explained with reference to the system of Figs. 3 and 4. It is supposed that the recording of one digit in this register is sufficient to control the connected trunk group selector $GK_1$. If necessary the register can be equipped for the positioning of the group selector $GK_1$ by more than one digit. It is possible to include conversion-facilities in the automatic system according to the invention, as it is the case with every register system. Considering that this fact is not part of the present invention, conversions are not included in the shown embodiments.

Let it be supposed that only one digit is necessary for routing, so that relay ISR pulses one digit to the marking switch $MS_1$. Then a circuit is closed from ground over the cam C of the sequence switch to the winding of the starting relay $SR_1$, the loop over the wipers *g* and *h* of the register finder $RZ_1$, the back contacts of the switching relay $OR_1$, the middle of the first winding of a transformer $TR_1$, the back contact 1 of a relay $GT_1$, a relay $KMR_1$, and battery to ground. Thus relay $SR_1$ and relay $KMR_1$ are energized which closes a circuit for the stepping magnet $KM_1$ of group selector $GK_1$. $KM_1$ is energized in a circuit: ground, back contact of relay $GTR_1$, front contact of relay $KMR_1$, stepping magnet $KM_1$, battery, to ground.

At the same time the two testing frequencies belonging to the numbers of the exchanges B and C are applied to the transformer $TR_2$ by means of the contacts of cam D of the sequence switch in the register; the frequencies are generated, respectively, by the generators $G_a^I$ and $G_b^I$ in the circuits from ground, generators $G_a^I$ and $G_b^I$, their associated filters $F_a^{III}$ and $F_b^{III}$, the wipers *a* and *b* of the marking switch $MS_1$, which is positioned by the mentioned impulse series, the rectifier arrangements connected to test relays AR and BR, cam D, primary winding of transformer $TR_2$ to ground. Over the secondary winding of the transformer $TR_2$, the wipers *g* and *h* of the register finder $RZ_1$, the back contacts of the relay $OR_1$, the transformer $TR_1$ and the rectifier arrangement connected to the testing relay $TFR_1$, the two testing frequencies are applied to the wiper *d* of the group selector $GK_1$. The group selector should be provided with a home position, while the contact bank should be mounted in such a way that the contacts of the main direction to exchange C lie in the bank before the contacts of the lines of the overflow to exchange B, so that the wiper *d* of the trunk group selector $GK_1$ first tests the contacts of the main direction and the contacts of the overflow later only in case there are no free lines in the main direction.

If a free line is found in one of the two groups, the group selector $GK_1$ stops in a way which has been described with reference to Fig. 4, e. g. in the first selecting stage by means of relays $TFR_1$, $GTR_1$, $GT_1$, $KMR_1$, $OR_1$ and stepping magnet $KM_1$. There should be a criterion in the register, which indicates whether a free line is found in the main direction or in the alternative route. For, if a free line is obtained in the main direction, the emission of the following digits in the form of alternating currents of predetermined voice frequencies can take place normally; if, however, a free line in the alternative route is obtained, a repetition of the call should be effected from exchange B.

In order to effect this, the marking switch $MS_1$ of the first digit has two banks *a* and *b*. When there is a call for exchange C, the testing frequency of this exchange is applied to bank *b* of the marking switch $MS_1$, while the testing frequency of the exchange B is applied to bank *a* of said switch. By means of the relays AR and BR the register is informed in what group of lines the group selector $GK_1$ finds a free outlet. After the group selector $GK_1$ has found an outlet, the starting relay $SR_1$ is released, since relay $GT_1$ is energized and thus breaks the circuits for relays $KMR_1$ and $SR_1$.

Relay $SR_1$ now releases the armature thereof and thus applies ground to one of the contacts of cam B of the sequence switch, depending on whether relay AR or BR has been energized, thus controlling the sequence switch.

If relay BR is energized, i. e. if a free line to exchange C has been found the sequence switch is directed in such a manner (not shown in the drawing) that the frequency of the following digits recorded by the register is emitted. If, however, relay AR had been energized, i. e. when a line in the alternative route had been obtained, then the sequence switch is directed to that position in which the frequency applied to bank *b* of the marking switch $MS_1$ is emitted again.

In both cases ground is applied to the loop of the wipers *g* and *h* of the register finder $RZ_1$ over cam C of the sequence switch, as starting signal for the apparatus in the next exchange. Depending on whether a two-wire or four-wire trunk line is applied the starting—and switching—through criterion can be passed on in usual manner.

For the sake of simplicity the drawings relate to a two-wire trunk from which an arrangement for a four-wire trunk is easily deduced.

The frequency which is emitted in exchange A can position the apparatus in the other trunk exchanges only under special circumstances without utilizing special switching elements, for instance if the testing wipers of two different selectors are directed to the same group of contacts, and if these wipers simultaneously move in another group which is not the right one. In this case the same testing or control frequency is applied to both the testing wipers. If these frequencies come from different exchanges, the phase is, as a rule, not the same, which enables the energization of the two relays TFR of the moving selectors which test a free line in an undesired group of contacts.

This difficulty can be overcome by synchronizing the generators and imparting a special phase rotation to the trunk lines between the exchanges, so that the various incoming control frequencies always have the same phase as ıe frequencies present in the exchange. Another soluon can be obtained by applying separate filters to the :lecting stage belonging to a particular group of trunk nes. This causes, however, difficulties if the various :oups have the same filters. A simple solution, which satisfactory under any circumstances, and which can ɔmprise conversion facilities, which for some reason ɔuld not be provided in the register of the exchange ;sociated with the calling subscriber, is the equipment of set of registers belonging to a particular group of lines ith filters common to these registers, the filters being ɔt the same as those applied in the local exchange.

The group of lines in exchange B coming from exchange . is provided with registers, which can be connected to ıe calling trunk line by means of the register finder $RZ_2$. he two shown incoming circuits of exchange C are ɥuipped each with a register belonging to each line, which ıay have very small dimensions.

Let it be supposed that the group selector $GK_1$ of exıange A has found a free outlet in the main direction to ıe exchange C. The start impulse is applied as ground ı cam C of the sequence switch in the register of exıange A and extended over relay $SR_1$, primary winding f transformer $TR_2$, wipers *g* and *h* of register finder $RZ_1$, ·ont contacts 1 and 2 of relay $OR_1$, back contacts 1 nd 2 of relay $DR_1$, wires *a* and *b*, leads 3 and 4 leading ver Fig. 6 to Fig. 7, back contacts of relay $DR_4$, priıary winding of transformer $TR_6$, back contact 2 of relay $_3$, relay $R_3$, battery, back to ground. Relay $R_3$ is now nergized, and a free register engaged in the direct route y means of the register finder $RZ_3$.

A free register is seized by operating the seizing relay $.MR_5$ in the circuit: ground over contact 2 of relay $R_3$, a ıultiple of register seizing relays of which relay $KMR_5$ shown, battery to ground. The stepping magnet $KM_4$ energized and the register finder $RZ_3$ tests over the ·iper *b* thereof for the calling line, which test when findıg said line, results in the operation of relay $T_3$ and relay $_3$, the circuit being: ground, relay $T_3$, contact 1 of ːlay $R_3$, wiper *b* of the register finder $RZ_3$, back contact f relay $D_3$, relay $C_3$, battery, ground.

The contact 2 of relay $C_3$ interrupts the operating ciruit of the stepping magnet $KM_4$ of the register finder $.Z_3$. Relay $T_3$ closes a holding circuit over the contact 1 ıereof and interrupts the circuit for relay $R_3$ at contact 2 f relay $T_3$. Relay $R_3$ releases and breaks the circuit for reıy $KMR_5$ so that the register finder may not be started gain. A circuit is now established for relay $KR_2$ from round in Fig. 5 over cam C of the sequence switch of ːgister A, relay $SR_1$, mid point of secondary of transɔrmer $TR_2$, wipers *g* and *h* of register finder $RZ_1$, front ɔntacts 1 and 2 of relay $OR_1$, back contacts 1 and 2 f relay $DR_1$, wipers *a* and *b* of the trunk group selector $;K_1$, leads 3 and 4 in Fig. 6 to Fig. 7, contacts 1 and 2 of ːlay $DR_4$, primary of transformer $TR_6$, front contact 2 f relay $T_3$, wiper *d* of the register finder $RZ_3$, front conıct 4 of relay $C_3$, back contact 1 of relay $HSR_3$, relay $:R_2$, battery, to ground.

Figure 6:
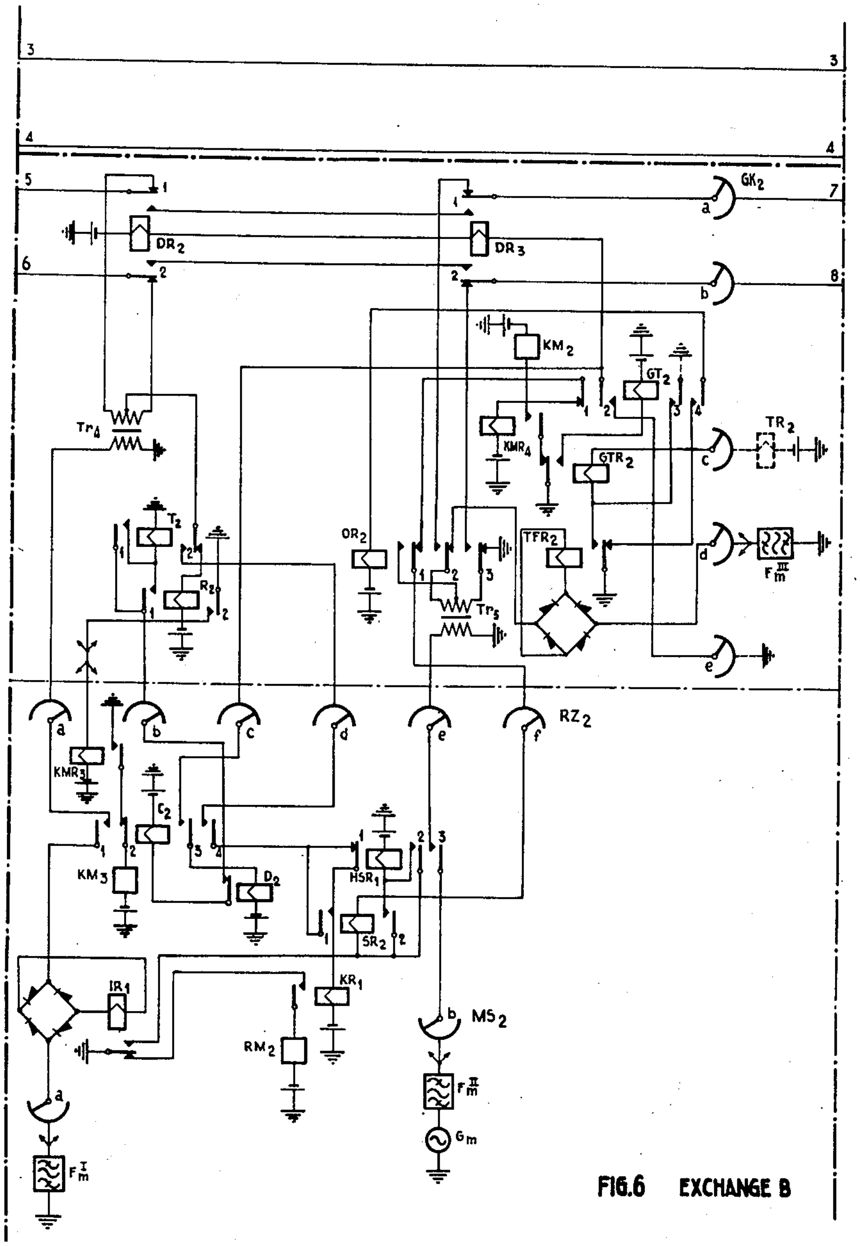

Relay $KR_2$ attracts the armature thereof and thus closes ıe circuit: ground, back contact of relay $IR_3$, front conıct of relay $KR_2$, stepping magnet $KM_3$, battery to ground ɔ that the stepping magnet $KM_3$ of the marking switch $1S_3$ is energized until the wiper *a* of marking switch $MS_3$ nds the filter $F_n{}^I$ corresponding with the frequency mitted by the generator $G_a{}^I$ of the register in exchange A. ·hen the relay $IR_3$ is energized in the circuit: ground, lter $F_n{}^I$, wiper *a* of marking switch $MS_3$, rectifier and reıy $IR_3$, front contact 1 of relay $C_3$, wiper *a* of register nder $RZ_3$, transformer $TR_6$, back contacts 1 and 2 of relay $)R_4$, leads 3 and 4 in Fig. 6, wipers *a* and *b* of group seːctor $GK_1$, back contacts 1 and 2 of relay $DR_1$, front conıcts 1 and 2 of relay $OR_1$, wipers *g* and *h* of register finder $:Z_1$, transformer $TR_2$, cam D of sequence switch, rectifier nd relay AR, wiper *a* of marking switch $MS_1$, filter $F_a{}^{III}$, generator $G_a{}^I$, ground. By attracting the armature thereof, relay $IR_3$ interrupts the circuit of the stepping magnet $RM_3$ shown in Fig. 7, thus stopping the marking switch $MS_3$. This searching for the recorded frequency is analogous to the identification of a subscriber in a local exchange. Thereafter the relay $HSR_3$ closes at the contact 3 thereof the circuit for the emission of the local frequency corresponding to the frequency received from the exchange A. If necessary a systematical interchange of the control frequencies may be applied at this point. In this manner the control or testing frequency at the wipers of the various selecting stages has always the same phase for the same frequencies. As a result of the energization of relay $IR_3$, relay $SR_3$ and the relay $KMR_6$ of the stepping magnet $KM_3$ of the group selector $GK_3$ in exchange C are energized. Relay $SR_3$ is energized in the circuit: ground, front contact of relay $IR_3$, relay $SR_3$, wiper *f* of register finder $RZ_3$, back contact 1 of relay $OR_3$, back contact 1 of relay $GT_3$, relay $KMR_6$, battery, ground.

Relay $KMR_6$ closes the circuit: ground, back contact of relay $GTR_3$, front contact of relay $KMR_6$, stepping magnet $KM_3$, battery, ground.

The magnet $KM_3$ is energized and the group selector $GK_3$ starts hunting. With the front contact 2 thereof relay $SR_3$ closes the circuit of the auxiliary starting relay $HSR_3$ over: ground, front contact of relay $IR_3$, front contact 2 of relay $SR_3$, relay $HSR_3$, battery to ground. Front contact 3 of relay $HSR_3$ closes the circuit over which the frequency emitted by generator $G_n$ is applied to bank *b* of the marking switch $MS_3$. The searching and testing of a free outlet in the desired direction and the switching through to the following selecting stages is effected in the same manner as described with reference to Figs. 3 and 4. When a free outlet is found, the armature 1 of relay $GT_3$ interrupts the circuit of the relay $SR_3$. Relay $SR_3$ releases and interrupts with the armature 1 thereof the junction of the register in exchange C with the register in exchange A, as a sign that the last-mentioned register can switch through to the emission of the frequency of the next digit. The emission of the alternating current of exchange A is interrupted, so that relay $IR_3$ releases the armature thereof which breaks the circuit of relay $HSR_3$ which is deenergized. The following digits direct the following selecting stages as long as these stages stay in exchange C.

The testing of a connection leaving exchange C may be indicated e. g. by the finding of ground at the bank *e* of the group selector. This criterion may, however, also be indicated in another manner, e. g. by means of an extra bank at the marking switch $MS_3$. The ground criterion at bank *e* of the group selector or further selecting stages in the exchange C forms the sign of the termination of the operation of the associated incoming register. Over make contact 2 of relay $GT_3$ both the switching relays $DR_4$ and $DR_5$, which may be combined to one relay, are energized so as to switch the wires *a* and *b* through and restore the register to normal.

The group selector remains operated depending on seizing criteria, which are well-known in the art and are not considered here. If no free lines from exchange A to exchange C are available, while some to exchange B are free, the sequence switch in the register A in Fig. 5, controlled by the relay AR, is brought in such a position that the calling frequency of exchange C is emitted in the alternative direction to exchange B, this being the overflow route.

In Fig. 6 a group selector $GK_2$ of exchange B is shown together with a register and a register finder $RZ_2$ which may be common to a plurality of incoming lines from exchange A. One separate set of filters is required for all the registers belonging to this direction.

The emission of the before-mentioned starting criterion by the register in exchange A in Fig. 5 energizes the relay $R_2$ in exchange B. In its turn the relay $R_2$ operates the relays such as relay $KMR_3$ in all the registers belonging to the multiple, so that the stepping magnets such as $KM_3$ of the register finders of all free registers belonging to the multiple are energized. A free register is then engaged in the way described hereinbefore with reference to Fig. 7.

The actual operation of the register is analogous to the one described before for exchange C. When a free line in the group from exchange B to exchange C is available, the operation of the register in exchange B is terminated, while the register in exchange A can proceed in the normal way with the emission of the frequencies belonging to the next digits over the line which is found available in cooperation with the auxiliary register in exchange C (Fig. 8) or other distant exchanges (not shown.)

If necessary, in the trunk system according to the present invention there can be a choice between several kinds of lines of different routes by increasing the number of "routing relays" AR and BR in the system. Moreover, in the route for the overflow of the intermediate exchanges, if necessary several times in succession, there can be a choice between a direct route or an alternative route; or between a group of main direction lines, or a group of overflow lines.

Figure 9:
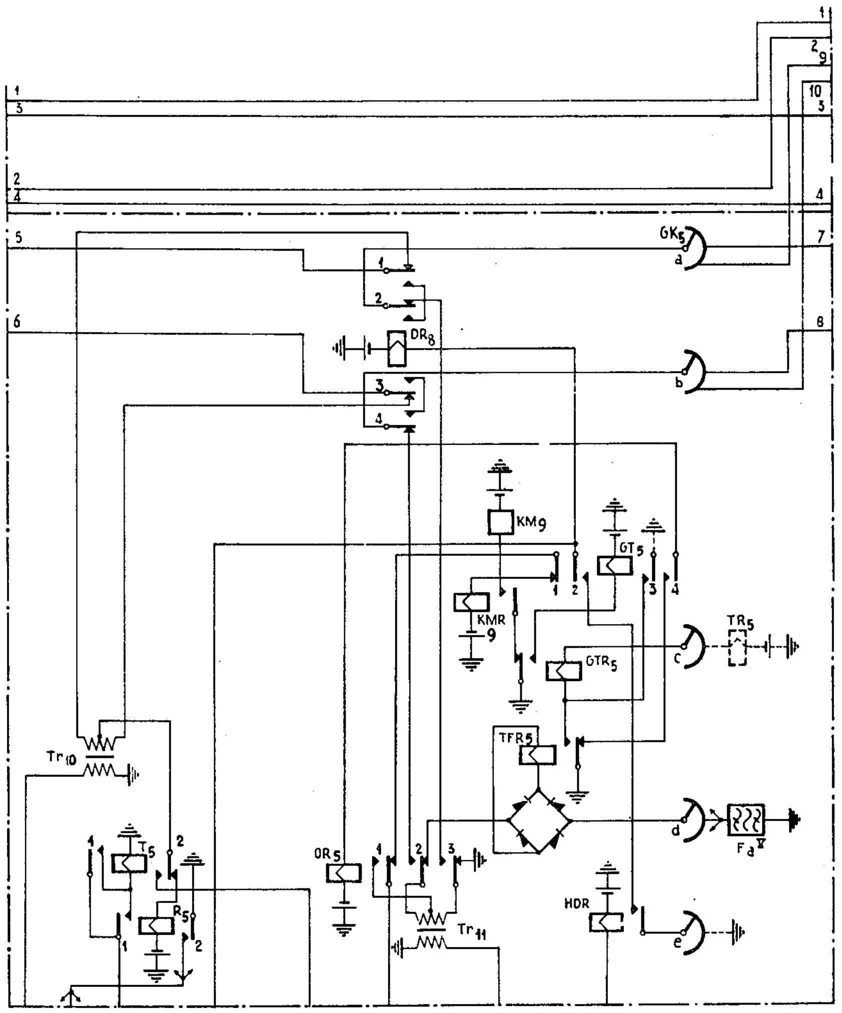
Figure 10:
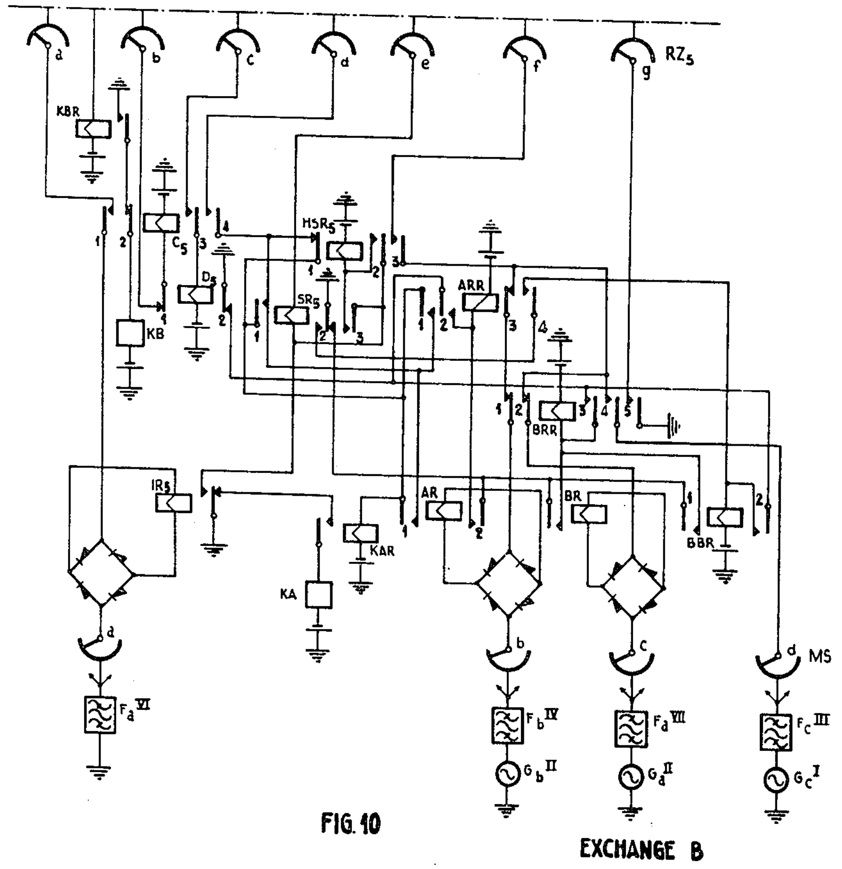
Figure 11:
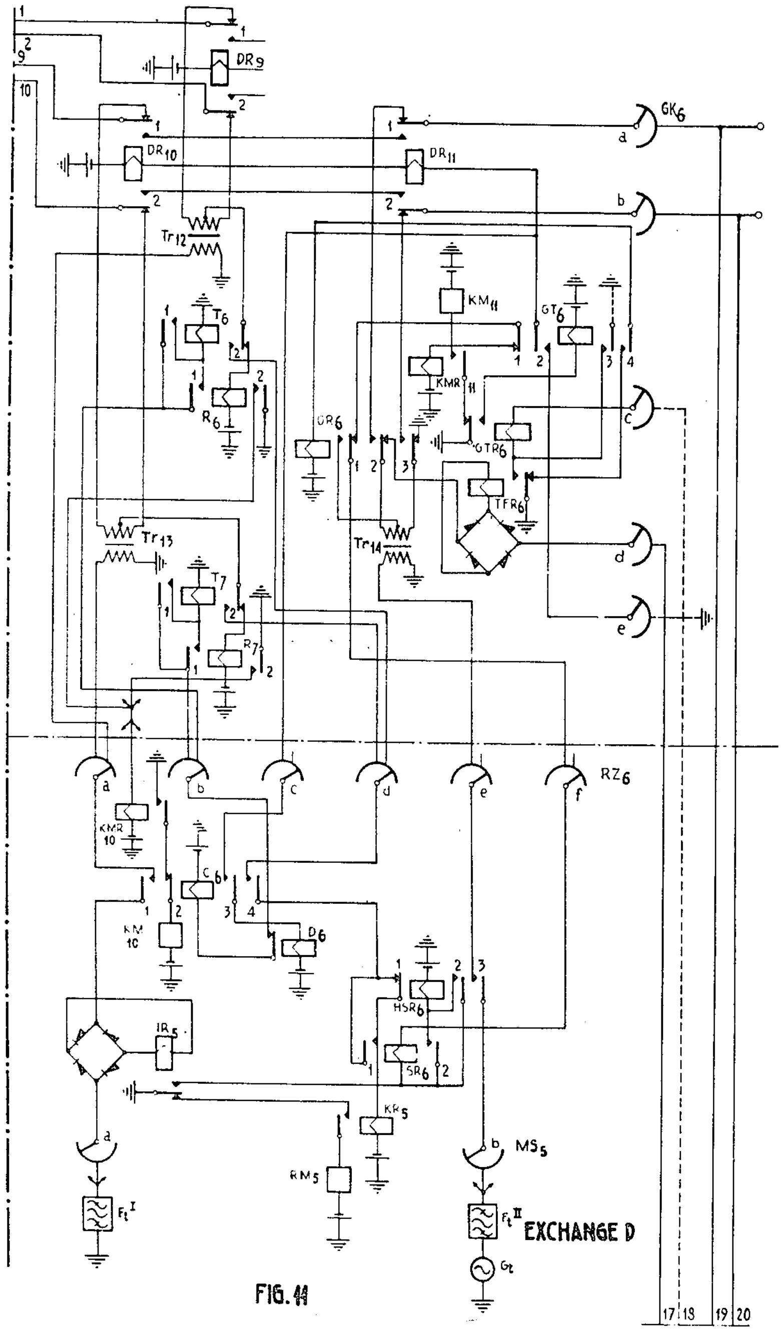
Figure 12:
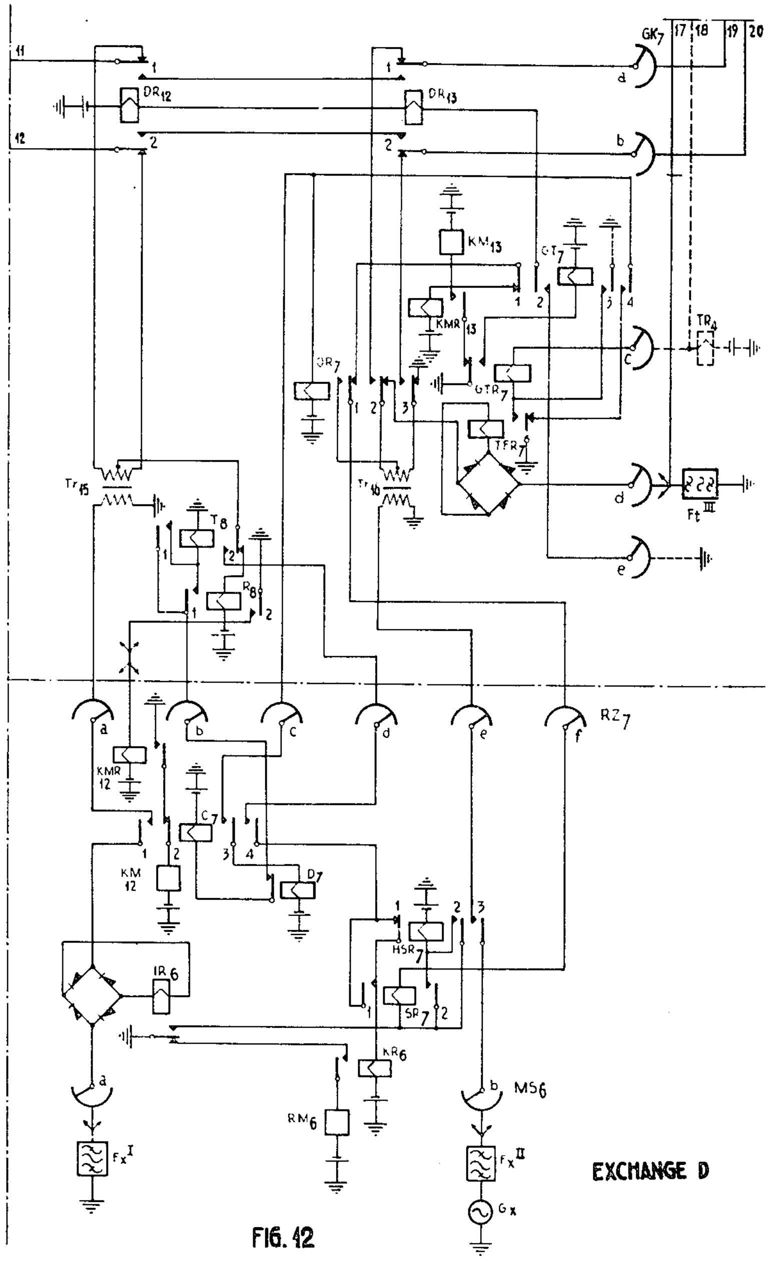

Figs. 9 and 10 show this possibility for a group selector from an intermediate exchange.

This arrangement shows a trunk group selector with the associated register, over which the traffic of a particular exchange can be diverted, and which can make a choice between a direct route and an alternative route. This is a facility which can easily be provided in register systems, and which in the system according to the present invention is especially useful owing to the speed of operation.

The case can be represented by four exchanges; A shown in Figs. 3 and 5, B shown in Figs. 9 and 10, C shown in Figs. 7 and 8, and D shown in Figs. 11 and 12. A is a district exchange belonging to the group exchange B, and D is a district exchange belonging to the group exchange C.

The traffic between A and D is supposed to be so heavy at times that an alternative route A—D is required. The traffic between B and D is also supported to require an overflow. To direct a call from exchange A to exchange D three routes are available, i. e. the direct route A—D, the alternative route A—B and direct route B—D; and the route A—B—C—D. The choice between the routes A—D and A—B—D is quite analogous to that in the arrangement explained with reference to exchanges A and C in Figs. 5, 6, 7 and 8. The addition of the route A—B—C—D to A—B—D can be effected by equipping the register of exchange B in the way shown in Figs. 9 and 10.

Figure 7:
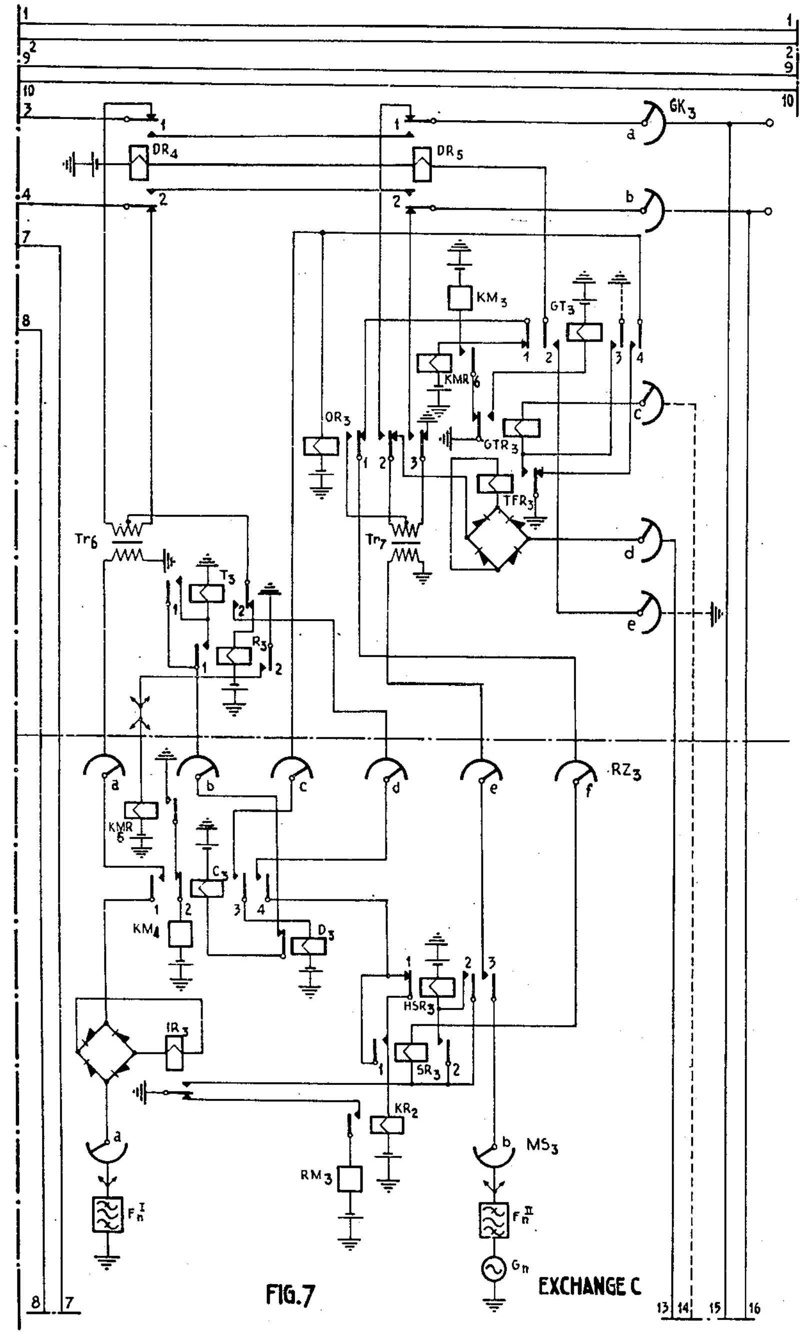
Figure 8:
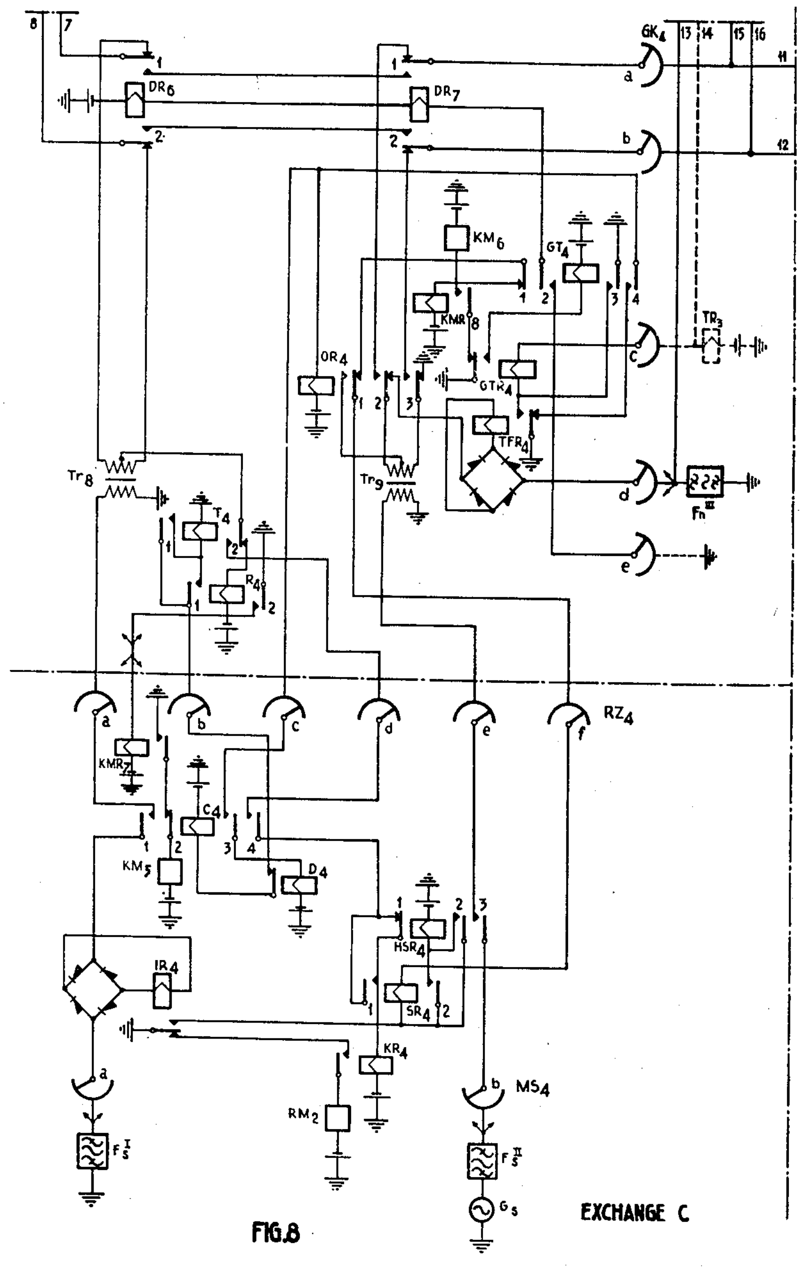

The register finder $RZ_5$ (Fig. 10) is started and a free register is connected with the calling line as described for Fig. 7 when a group selector $GK_1$ in Fig. 5 seizes a line to exchange B in Fig. 9 after which the marking switch MS in Fig. 10 hunts for the recorded frequency in the way described with reference to Fig. 7 for the register of exchange C. The marking switch MS is equipped with four banks of contacts. The frequency of the overflow B—C is applied to the bank *b* of the marking switch MS; the frequency of the direct route B—D is applied to the bank *c*. The associated group selector should have a home position, in order to enable the hunting wiper to test the lines in the main direction before occupying a free line in the overflow. The relays AR and BR in the register in Fig. 10 indicate whether the direct route or the alternative route is seized. When a free line is found, the group selector is stopped in the described way, except that the relay $DR_8$ is not energized, so that the transit register remains in the circuit, since relay HDR is deenergized. If a free line in the direct route is seized, the operation of the transit register is not terminated, before over the alternative route, that is in this case over exchange C, a free line to exchange D is found by the continued transmission of the calling frequency of exchange C, which is applied to wiper *c* of marking switch MS. This is effected as follows: in Fig. 10 the relay AR is energized and thus bridges with its front contact 1, front contact 1 of relay $SR_5$ and the front contact 1 of relay $HSR_5$ so that the circuit of relay $SR_1$ in the exchange A and that of relay KAR in the exchange B are not disconnected.

As a result of this the register in the preceding exchange A cannot switch through the armatures of the relays thereof so that the emission of the following digit is prevented. When the group selector $GK_5$ in the exchange B has found a free line in the alternative route, relay $SR_5$ in the associated register releases, as a result of which the relay ARR is energized in the circuit: ground, back contact 2 of relay $SR_5$, front contact 2 of relay AR, relay ARR, battery, and forms a holding circuit over front contact 2 of relay ARR, back contact 2 of relay $D_5$ to ground. The relay ARR interrupts the emission of the frequency of the generator $G_b^{II}$ applied to the bank *b* of the marking switch MS. By this interruption the relay $OR_5$ (Fig. 9), switches the testing frequency applied to bank *c* of the marking switch MS to the following exchange. The switching through of the wires *a* and *b* by means of the relay $DR_8$, when ground is found by wiper *e*, does not take place, as the relay HDR in Fig. 9 remains de-energized. The positioning of the group selector $GK_3$ in the next exchange C is effected in the manner already described. As soon as relay $SR_5$ (Fig. 10) is energized, relay BBR is also energized in the circuit: ground, front contact 2 of relay $SR_5$, front contact 4 of relay ARR, relay BBR, to battery. Relay BBR forms a holding circuit over contact 2 thereof: ground, back contact 2 of relay $D_5$, front contact 2 of relay BBR, relay BBR, to battery. With its front contact 1 relay BBR prepares a circuit for relay BRR. When the group selector $GK_3$ in the next exchange C has found a free line, relay $SR_5$ (Fig. 10) releases the armatures thereof once more, owing to which the relay BR and consequently the relay BRR is energized in the circuit: ground, back contact 2 of relay $SR_5$, front contact of relay BR, relay BRR, to battery. Now the relay HDR is energized in the circuit: ground, back contact 5 of relay BRR, wiper *g* of register finder $RZ_5$, relay HDR, battery, so that the operation of the register in Fig. 10 is terminated by the operation of the switching relay $DR_8$ which is now energized in the circuit: ground, wiper *e* of group selector $GK_5$, front contact of relay HDR, front contact 2 of relay $GT_5$, relay $DR_8$ to battery and ground. In case of the switching on, the relay $D_5$ in the register of Fig. 10 operates and interrupts the circuit of the testing relay $C_5$, the register being released for other calls. If at the positioning action of the group selector a free line in the cross direction is seized, the relay BRR is energized directly, owing to which the operation of the register is terminated directly.

By unsystematical mounting of the generators with respect to the various banks (*b* and *c*) of the marking switch MS, all kinds of conversions can be realized. For a decimal passing of digits e. g. a *d*-bank can be added to the marking switch MS.

Under particular circumstances advantageous use can be made of group finders instead of group selectors in local as well as in trunk exchanges. Fig. 13 shows the principle of a group finder in a telegraph or telephone system according to the invention. The system according to the invention involves a specific advantage over the group selector stages applied in known register systems. That is to say in the known register systems the register controls a positioning circuit with a marking switch by means of an impulse series. Only thereafter e positioning circuit controls the positioning of the set group finders belonging to the desired direction.

This system has serious drawbacks. In the system cording to the invention, depending on the equipment, ıly one or more marking wires are required so that is e. g. easily possible to control the group finders of stage from a register that lies closer to the caller by ıe or more selecting stages.

Fig. 13 shows a group finder with part of a register, so far as this is necessary to explain the drawing. In e register a facility of overflow is provided. It is supısed that on the marking switch MS a figure of an :change is recorded which can be reached either over direct route or over an alternative route. After the ırting of the register (the means for which are not .own), the sequence switch in the register steps to the ılsing out position, in which bank *a* and bank *c* of the arking switch MS are connected to the contacts of the .ms C and E, respectively, of the sequence switch. The equency applied to bank *a* of the marking switch MS passed on via the bank *b* of the register finder RZ, the ansformer TR, and the changeover contacts 1 and 2 of lay $OR_1$ to the contacts at the bank *c* of all the group ıders, such as GZ, of all the directions occurring in this lecting stage, which belong to the position of the regisr finder RZ. Determined by the position of the markg switch MS (bank *c*), the group finders of the desired ıtgoing direction are started, because the additional arting relay, such as $SR_1$ or $SR_2$, is energized by the gister. For the group shown in Fig. 13 relay $SR_1$ is ıergized. Relay $SR_1$ in its turn energizes all the stepng magnets, such as KM, of the available group finds, which belong to the desired direction. All the ʼailable group finders start hunting. The test relay TFR : the first group finder found by the calling contact is ıergized and locks by means of a direct current test the ized group finder. This test may, if desired, be effected / means of a relay GTR disconnecting the operating rcuit of the associated stepping magnet, while the relay R by means of the make contact thereof applies ground ı the register which indicates that a free group finder in .e desired direction has been found. Now the sequence vitch steps to a following position in which the next git is issued, owing to which the remaining finders of .e moved group stop, if no other calls are being made.

Over the make sides of the change-over contacts of ·lay $OR_1$ which is operated for switching on to a folʼwing group, and over the make contacts of relay $OR_2$ hich is operated at the energization of relay GTR, the :gister is switched to a following selecting stage. The rcuit of the starting relay analogous to relay $SR_1$ but :longing to a particular direction goes over the parallel ɔrmal contacts of the relays analogous to relay $OR_2$. all the outgoing lines are occupied in a particular di:ction, the associated starting relay cannot operate in ıse of a following call for that direction, so that the :lay AR in the register remains de-energized. If a :oup of an alternative route is concerned, the sequence vitch steps directly on to the position, in which the iper bands *d* of the marking switch MS are connected ı the fixed contacts of the cams C and E. Owing to ıis a set of group finders in the alternative route is arted (by relays $SR_2$). After seizing a free line in ıe overflow the calling frequency of the desired exıange is emitted over the overflow in a manner which is ɔt shown in Fig. 6. Taking in account the principles nbodied in the arrangement according to Fig. 6, a ngle group finder stage can be extended to a double :oup finder stage, in which the hunting of the two stages ın be effected simultaneously, a minimal searching time ɜaring necessary.

It will be understood that each of the elements de:ribed above, or two or more together, may also find a useful application in other types of automatic signalling systems differing from the types described above.

While the invention has been illustrated and described as embodied in an automatic signalling system having a register, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a signalling arrangement, in combination, a plurality of generators each producing an alternating current having a frequency different from the frequency of the alternating currents produced by the other of said generators; a first set of band filters each connected with one of said generators and passing the alternating current frequency produced by the generator to which it is connected in series; a second set of band filters each connected with one of said generators and passing the alternating current frequency produced by the generator to which it is connected in series; a first switch means having a first bank of contacts connected, respectively, to said first band filters; a second switch means having a second bank of contacts connected, respectively, to said second band filters; a first wiper forming part of said first switch means brushing said first bank of contacts; a second wiper forming part of said second switch means brushing said second bank of contacts; a connection between said first and second wipers, current-responsive means inserted in said connection; electromagnetic means for moving one of said wipers over said bank of contacts cooperating with the same; and means controlled by said current-responsive means for energizing said electromagnetic means when said current-responsive means does not respond to any current, whereby said electromagnetic means is put out of action when said wipers contact, respectively, contacts of said banks connected to said band filters.

2. In a signalling arrangement, in combination, a plurality of generators each producing an alternating current having a frequency different from the frequency of the alternating currents produced by the other of said generators; a first set of band filters each connected with one of said generators and passing the alternating current frequency produced by the generator to which it is connected in series; a second set of band filters each connected with one of said generators and passing the alternating current frequency produced by the generator to which it is connected in series; a marking switch means having a first bank of contacts connected, respectively, to said first band filters; a selector switch means having a second bank of contacts connected, respectively, to said second band filters; a first wiper forming part of said marking switch means brushing said selector bank of contacts; a second wiper forming part of said selector switch means brushing said second bank of contacts; a connection between said first and second wipers; a current-responsive means inserted in said connection; electromagnetic means for moving said wiper of said selector switch means over said bank of contacts cooperating with the same; and means actuated by said current-responsive means for energizing said electromagnetic means when said current-responsive means does not respond to any current, whereby said electromagnetic means is put out of action when said wipers contact, respectively, contacts of said banks connected to said band filters.

3. A signalling arrangement for telecommunication systems, comprising, in combination, a first station sending at least one current impulse; a second station to be connected with said first station; register means; a plurality of voice frequency generators forming part of said register means, each of said generators producing an alternating current having a frequency different from the frequencies of the alternating currents produced by the other of said generators; marking switch means forming part of said register means, said marking switch means having a bank of contacts connected, respectively, to said generators so that said contacts of said bank of said marking switch means are marked, respectively, by the frequencies of the alternating currents produced by said generators, the frequency of any of said contacts of said bank of said marking switch means being different from any of the frequencies of the other contacts of said bank of said marking switch means; a wiper forming part of said marking switch means and cooperating with said bank of contacts of said marking switch means; means for positioning said wiper of said marking switch means by said current impulse sent by said first station; a set of band filters connected with said generators, each of said band filters of said set passing a predetermined frequency corresponding substantially to one of the frequencies generated by said voice frequency generators; selector switch means for making a connection between said first station and said second station, said selector switch means having a bank of contacts connected, respectively, to said set of band filters so that said contacts of said bank of said selector switch means are marked, respectively, by the frequencies of the alternating currents passed by said band filters, the frequency of any of said contacts of said bank of said selector switch means being different from any of the frequencies of the other contacts of said contact bank of said selector switch means, the frequencies of said contacts of said bank of said selector switch means being equal, respectively, to the frequencies of said contacts of said bank of said marking switch means; a wiper forming part of said selector switch means and cooperating with said bank of contacts of said selector switch means; an electric circuit; an electromagnet having a winding arranged in said electric circuit, said electromagnet stepping said wiper of said selector switch means along said bank of contacts of said selector switch means; and means for interrupting said electric circuit and thereby de-energizing said winding of said electromagnet when said wipers contact, respectively, contacts of said banks of said marking and selector switch means being marked by equal frequencies so as to stop said wiper of said selector switch means, thereby positioning said selector switch means according to the current impulse sent by said first station so that said selector switch means connect said first station and said second station with each other.

4. A signalling arrangement for telecommunication systems, comprising, in combination, a first station sending at least one current impulse; a second station to be connected with said first station; register means; a plurality of voice frequency generators forming part of said register means, each of said generators producing an alternating current having a frequency different from the frequencies of the alternating currents produced by the other of said generators; marking switch means forming part of said register means, said marking switch means having a bank of contacts connected, respectively, to said generators so that said contacts of said bank of said marking switch means are marked, respectively, by the frequencies of the alternating currents produced by said generators, the frequency of any of said contacts of said bank of said marking switch means being different from any of the frequencies of the other contacts of said bank of said marking switch means; a wiper forming part of said marking switch means and cooperating wit said bank of contacts of said marking switch mean means for positioning said wiper of said marking switc means by said current impulse sent by said first statio a set of band filters connected with said generators, eac of said band filters of said set passing a predetermine frequency corresponding substantially to one of the fre quencies generated by said voice frequency generator selector switch means for making a connection betwee said first station and said second station, said selecto switch means having a bank of contacts connected, re spectively, to said set of band filters so that said contact of said bank of said selector switch means are marked respectively, by the frequencies of the alternating cur rents passed by said band filters, the frequency of an of said contacts of said bank of said selector switch mean being different from any of the frequencies of the othe contacts of said contact bank of said selector switc means, the frequencies of said contacts of said bank o said selector switch means being equal, respectively, t the frequencies of said contacts of said bank of sai marking switch means; a wiper forming part of said se lector switch means and cooperating with said bank o contacts of said selector switch means; an electric ci cuit; an electromagnet having a winding arranged in sai electric circuit, said electromagnet stepping said wipe of said selector switch means along said bank of contact of said selector switch means; an electric contact a ranged in said electric circuit in series with said wind ing of said electromagnet; a first relay controlling sai contact so as to open the same and to de-energize sai electromagnet when said first relay is energized; a secon relay having a contact connected in series with said fir relay; means for energizing said second relay when sai second station is busy, said contact of said second re lay completing the circuit of said first relay upon energi zation of said second relay; and a set of rectifiers havin input terminals connected, respectively, to said wipe of said marking and said selector switch means, the ou put of said set of rectifiers being connected to said fir relay whereby said first relay is energized when said sec ond station is free so that second relay does not preve said first relay from being energized and said wipers co tact, respectively, contacts of said banks of said mark ing and selector switch means being marked by equa frequencies so as to stop said wiper of said selecto switch means, thereby positioning said selector switc means according to the current impulse sent by said fir station so that said selector switch means connect sai first station and said second station with each other.

5. In combination, a selector; a contact bank and wiper engaging said contact bank and forming part c said selector; means for frequency marking one conta of said contact bank; a current source connected to sai selector; a circuit including said current source, sai wiper, and one contact of said contact bank; a relay form ing part of said circuit, and being controlled by said fre quency marking means; means for completing said ci cuit and operating said relay; and means controlled b said relay for positioning said wiper of said selector.

6. In combination, a selector and a marking switc means for positioning said marking switch; a curre source connected to said marking switch for frequenc marking the position of said marking switch; means f positioning said selector; a circuit including said sele tor, said marking switch and said current source, an completed when said selector reaches a position corr sponding to the frequency marked position of said mar ing switch; and a relay included in said circuit for r leasing said means for positioning said selector when sai selector reaches the position corresponding to the marke position of said marking means.

7. In combination, a finder and an identification swit for identifying the position of said finder; means for p sitioning said finder; a current source connected to sai finder for marking the position of said finder; means for positioning said identification switch; a circuit including said finder, said identification switch and said current source, said circuit being completed by said means for positioning said identification switch when said identification switch reaches a position corresponding to the marked postion of said finder; and a relay included in said circuit for releasing said means for positioning said identification switch when said circuit is completed.

8. In combination, selector and marking means; means for positioning said marking means; a plurality of means connected to said marking means for supplying frequencies for marking the positions of said marking means; means for positioning said selector; a plurality of means connected to said supply frequency means for passing the frequencies supplied by said means for marking the positions of said marking means, said selector selecting one of said plurality of means for passing the frequencies; and means for releasing said means for positioning said selector under control of the passed frequencies.

9. In combination, selector and marking means; means for positioning said marking means; a plurality of frequency marking means connected to said marking means for marking the positions of said marking means; means for positioning said selector controlled by said frequency marking means; a plurality of frequency marking means connected to said selector means for indicating the positions of said selector; and means for releasing said means for positioning said selector when the desired one of said plurality of frequency marking connected to said selector means is reached.

10. In combination, a selector and a marking switch; means for positioning said marking switch; a plurality of frequency marking means connected to said marking switch for marking the positions of said marking switch and said selector, respectively; means for positioning said selector; and means for releasing said means for positioning said selector when one of said frequency marking means marking the position of said selector corresponds to one of said frequency marking means marking the position of said marking switch.

11. In combination, a marking switch; means for positioning said marking switch; a plurality of frequency generators and filters for marking the positions of said marking switch; a selector switch; a plurality of filters connected to said selector for passing the frequencies produced by said frequency generators, respectively; said selectors selecting one of said plurality of filters connected to said selector for passing the frequency produced by one of said plurality of frequency generators marking a position of said marking switch; and means for positioning said selector, said means being controlled by one of said plurality of frequency generators marking a position of said marking switch.

12. In combination, a first switch and a second switch; means for positioning said first switch; an input and a number of outlets forming part of said first switch; a number of frequency marking means being connected to said input of said first switch, said number of marking means being smaller than said number of outlets of said first switch; a plurality of frequency marking means being connected to said outlets of said first switch; means for discriminating the position of said first switch controlled by said frequency marking means connected to said input and said outlets of said first switch, respectively; and means for positioning said second switch controlled by said means for discriminating the position of said first switch.

13. In combination, a first switch and a second switch; means for positioning said first switch; an input and a number of outlets forming part of said second switch; a number of frequency marking means being connected to said input of said second switch, said number of marking means being smaller than said number of outlets of said second switch; a plurality of frequency marking means being connected to said outlets of said second switch; means for discriminating the positions of said second switch controlled by said frequency marking means connected to said input and said outlets of said second switch, respectively; and means for positioning said second switch controlled by said first switch and said means for discriminating the positions of said second switch.

14. In combination, a register and a selector, said register for recording the position to be taken by said selector; an input and a plurality of outlets forming part of said selector; a marking switch in said register; a wiper and a plurality of marking positions forming part of said marking switch; a control circuit extending from said input of said selector to said wiper of said marking switch; frequency marking means connected to each of said marking positions of said marking switch and to each of said outlets of said selector, respectively; means in said control circuit for comparing the characteristics of said frequency marking means connected to said selector and said marking positions of said marking switch; and means for positioning said selector according to the record in said register under control of said means in said control circuit for comparing the characteristics of said frequency marking means.

15. In combination, a first and a second exchange; a first register in said first exchange; a second register in said second exchange; a trunk selector having a plurality of sets of co-operating contacts in said first exchange and having access to said second register in said second exchange; a marking switch in said first register for recording the position to be taken by said trunk selector; means for positioning said trunk selector; means for selecting the position of said trunk selector having access to said second register in said second exchange and positioning said marking switch accordingly; a current source for frequency marking the position of said marking switch and said contacts of one set of said plurality of sets of co-operating contacts of said trunk selector, respectively; a circuit including said trunk selector, said marking switch and said current source, said circuit being completed when said trunk selector reaches a position corresponding to the frequency marked position recorded by said marking switch; means including a second set of said plurality of sets of co-operating contacts of said trunk selector for performing a busy test; means in said circuit for operating said means for performing a busy test, said operating means and said means for performing a busy test serving to release said means for positioning said trunk selector when said circuit is completed.

16. In combination, a first, a second and a third exchange; a first trunk selector in said first exchange having a plurality of sets of co-operating contacts, said first trunk selector having access to said second exchange and to said third exchange, respectively; a second trunk selector in said second exchange having a plurality of sets of co-operating contacts, said second trunk selector having access to said third exchange; a first marking means in said first exchange having a plurality of sets of co-operating contacts for recording the position to be taken by said first trunk selector; means for positioning said first trunk selector; means for selecting the position of said first trunk selector giving access to said third exchange and for positioning said marking means accordingly; a first current source for frequency marking a first of said plurality of sets of co-operating contacts of said first marking means and for frequency marking one of said plurality of sets of co-operating contacts of said first trunk selector, respectively, by applying a first predetermined frequency thereto; a second current source for frequency marking a second of said plurality of sets of co-operating contacts of said first marking means and for frequency marking one of said plurality of sets of co-operating contacts of said first trunk selector, respectively, by applying a second predetermined frequency thereto; a first control circuit including said first trunk selector, said first of said plurality of sets of co-operating contacts of said marking means and said first current source, said first control circuit selecting a direct route to said third exchange; a second control circuit including said first trunk selector, said second of said plurality of sets of co-operating contacts of said marking means and said second current source, said second control circuit selecting an alternative route to said third exchange, said alternative route including said second exchange and said second trunk selector in said second exchange; means cooperating with said first trunk selector for performing a busy test of said first trunk selector; and means controlled by the current in said first and said second control circuits for releasing said means for positioning said first trunk selector.

17. In combination, a first, a second and a third exchange; a first trunk selector in said first exchange having a plurality of sets of co-operating contacts, said first trunk selector having access to said second exchange and to said third exchange, respectively; a second trunk selector in said second exchange having a plurality of sets of co-operating contacts, said second trunk selector having access to said third exchange; a first marking means in said first exchange having two sets of cooperating contacts for recording the position to be taken by said first trunk selector; means for positioning said first trunk selector; means for selecting the position of said first trunk selector giving access to said third exchange and for positioning said marking means accordingly; a first current source for frequency marking one of said two sets of co-operating contacts of said first marking means and for frequency marking one of said plurality of sets of co-operating contacts of said first trunk selector, respectively, by applying a first predetermined frequency thereto; a second current source for frequency marking the other of said two sets of co-operating contacts of said first marking means and for frequency marking one of said plurality of sets of co-operating contacts of said first trunk selector, respectively, by applying a second predetermined frequency thereto; a first control circuit including said first trunk selector, said one of said two sets of co-operating contacts of said first marking means, and said first current source, said first control circuit selecting a direct route to said third exchange; a second control circuit including said first trunk selector, said other of said two sets of co-operating contacts of said first marking means and said second current source, said second control circuit selecting an alternative route to said third exchange, said alternate route including said second exchange; means co-operating with said first trunk selector for performing a busy test on said first trunk selector; means co-operating with said control circuits for rendering the selection of an alternative route effective when the direct routes are found busy by said means for performing a busy test on said first trunk selector; means for recording the direct route taken, said means being controlled by the current in said first control circuit; means for recording the alternative route if taken and controlled by the current in said second control circuit, said means for performing a busy test and said means for recording the direct route co-operating to release said means for positioning said first trunk selector whereas said means for recording said alternative route sending supervisory signals to said second exchange for positioning said second trunk selector.

18. The system according to claim 17 and in which means are provided in said second exchange for receiving supervisory signals from said first exchange when said second exchange is connected in said alternative route to said third exchange; a second marking means in said second exchange for recording the position to be taken by said second trunk selector controlled by said supei visory signal receiving means; and means for positionin said second trunk selector controlled by said secon marking means in said second exchange.

19. In combination, a first, a second and a third ex change; a first register in said first exchange; a secon register in said second exchange; a third register in sai third exchange; a first trunk selector in said first exchang having a plurality of sets of co-operating contacts, sai first trunk selector having access to said second registe in said second exchange and said third register in sai third exchange, respectively; a second trunk selector i said second exchange having a plurality of sets of co operating contacts, said second trunk selector havin access to said third register in said third exchange; a fir marking switch having two sets of co-operating contac in said first register for recording the position to be take by said first trunk selector; means for positioning sai first trunk selector; means for selecting the position c said third trunk selector giving access to said third registe and for positioning said first marking switch accordingl a first current source frequency marking one of said tw sets of co-operating contacts of said first marking switc and for frequency marking one of said plurality of se of co-operating contacts of said first trunk selector, re spectively, by applying a first predetermined frequenc thereto; a second current source for frequency markin the other of said two sets of co-operating contacts c said first marking switch and for frequency marking or of said plurality of sets of co-operating contacts of sai first trunk selector, respectively, by applying a secon predetermined frequency thereto; a first control circu including said first trunk selector, said one of said tw sets of co-operating contacts of said first marking mear and said first current source, said first control circuit se lecting a direct route to said third register in said thir exchange; a second control circuit including said fir trunk selector, said other of said two sets of co-operatin contacts of said first marking means and said secon current source, said second control circuit selecting a alternative route to said third exchange, said alternativ route including said second exchange; means co-operatin with said first trunk selector for performing a busy te on said first trunk selector; a first relay energized by th current in said first control circuit for rendering sai means for performing a busy test effective when sai first control circuit selects a direct route to said thir exchange; said first relay also being energized by th current in said second control circuit for rendering sai means for performing a busy test effective when sai second control circuit selects an alternative route to sai third exchange; means co-operating with said control ci cuits for rendering the selection of an alternative rou effective when the selected direct routes are found bus by said means for performing a busy test on said fir trunk selector; a first means in said first register for re cording said direct route taken to said third exchang said means being controlled by the current in said fir control circuit; a second means in said first register fo recording an alternative route taken to said third ex change, said second means being controlled by the curre in said second control circuit, said means for performin said busy test and said means for recording the dire route releasing said means for positioning said first trun selector, whereas said means for recording said alternativ route sending supervisory signals to said second exchan for positioning said second trunk selector accordingly.

20. The system according to claim 19 and in which second marking switch located in said second register re cords the position to be taken by said second trunk selecto means for receiving supervisory signals transmitted by sai means for sending supervisory signals; and means for po sitioning said second trunk selector controlled by said sec ond marking switch in said second register.

21. The system according to claim 19 and in which . second marking switch having a first set of co-operating ontacts in said second register records the position to be aken by said second trunk selector; means for receiving upervisory signals transmitted by said means for sending upervisory signals; means for positioning said second runk selector; a third current source for frequency marking said first set of co-operating contacts of said second narking switch and for frequency marking one of said lurality of sets of co-operating contacts of said second runk selector, respectively, by applying a third predetermined frequency thereto; a third control circuit including aid second trunk selector, said first set of co-operating ontacts of said second marking switch and said third current source; means for performing a busy test on said econd trunk selector; means controlled by the current in aid third control circuit for rendering said means for erforming a busy test on said second trunk selector effecive, said means controlled by the current in said third ontrol circuit and said means for performing a busy test n said second trunk selector serving to release said means or positioning said second trunk selector.

22. The system according to claim 19 and in which said irst, said second and said third current source are a first, second and a third frequency generator, respectively.

23. In a signalling arrangement, in combination, a pluality of generators each producing an alternating current aving a frequency different from the frequencies of the lternating currents produced by the other of said generaors; a first set of band filters connected with said generaors, each of said band filters of said first set passing a preletermined frequency corresponding substantially to one f the frequencies of alternating currents produced by said enerators; a second set of band filters connected with aid generators, each of said band filters of said second set or passing a predetermined frequency corresponding subtantially to one of the frequencies of the alternating curents produced by said generators; a marking switch means aving a first bank of contacts connected, respectively, to aid first band filters; a selector switch means having a plurality of outlets and a second bank of contacts connected, respectively, to said second band filters, said marking switch means including a first wiper brushing said first bank of contacts, said selector switch means including a second wiper brushing said second bank of contacts; a set of rectifiers having input terminals connected, respectively, to said wipers; a first relay connected to the output of said set of rectifiers and having at least a front contact; a second relay connected to said front contact of said first relay so as to prepare the circuit of said second relay upon energization of said first relay; means for completing the circuit of said second relay when one of the outlets of said selector switch means corresponding to the position of said wiper of said selector switch means is idle; a contact controlled by said second relay; and an electro magnet in series to said contact of said second relay so that the circuit of said electro magnet is opened when said second relay is energized, said electro magnet for moving said wiper of said selector switch means over said bank of contacts co-operating with the same, whereby said wiper of said selector switch means is arrested when said first and second wipers contact, respectively, contacts of said banks connected to said band filters allowing to pass substantially the same frequency and when said outlet of said selector switch means being in touch with said wiper of said selector switch means is idle.

References Cited in the file of this patent

UNITED STATES PATENTS

| | | |
|---|---|---|
| 1,577,033 | Kerr | Mar. 16, 1926 |
| 1,956,371 | Christian | Apr. 24, 1934 |
| 1,974,159 | Patterson et al. | Sept. 18, 1934 |
| 2,087,405 | Humphries | July 20, 1937 |
| 2,341,746 | Taylor et al. | Feb. 15, 1944 |
| 2,354,667 | Deakin et al. | Aug. 1, 1944 |
| 2,354,668 | Deakin et al. | Aug. 1, 1944 |
| 2,354,682 | Herbig | Aug. 1, 1944 |
| 2,368,056 | Walsh | Jan. 23, 1945 |
| 2,432,098 | Gohorel | July 1, 1947 |
| 2,444,065 | Pouliart | June 29, 1948 |